(12) United States Patent
Groueix et al.

(10) Patent No.: US 12,633,006 B2
(45) Date of Patent: May 19, 2026

(54) GENERATING TILE-ABLE IMAGES UTILIZING A DIFFERENTIABLE MESH GENERATION AND RENDERING PIPELINE

(71) Applicant: Adobe Inc., San Jose, CA (US)

(72) Inventors: Thibault Groueix, Grenoble (FR); Noam Aigerman, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 410 days.

(21) Appl. No.: 18/457,762

(22) Filed: Aug. 29, 2023

(65) Prior Publication Data

US 2025/0078339 A1 Mar. 6, 2025

(51) Int. Cl.
*G06T 11/00* (2026.01)
*G06T 11/60* (2026.01)

(52) U.S. Cl.
CPC ............ *G06T 11/001* (2013.01); *G06T 11/60* (2013.01)

(58) Field of Classification Search
CPC ...... G06T 11/001; G06T 11/60; G06T 11/203; G06T 11/00; G06N 3/0475
See application file for complete search history.

(56) References Cited

U.S. PATENT DOCUMENTS 6,047,088 A * 4/2000 van Beek ............... H04N 19/46
                                                                375/E7.11
2024/0221242 A1* 7/2024 Greenen .................... G06T 5/70

OTHER PUBLICATIONS

Nagata, Y., & Imahori, S. (2021). "Escherization with large deformations based on as-rigid-as-possible shape modeling". ACM Transactions on Graphics (TOG), 41(2), pp. 1-16. (Year: 2021).*
Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. 2019. PyTorch: An Imperative Style, High-Performance Deep Learning Library. In Advances in Neural Information Processing Systems 32. Curran Associates, Inc., 8024-8035. http://papers.neurips.cc/paper/9015-pytorch-an-imperative-style-highperformance-deep-learning-library.pdf.

(Continued)

*Primary Examiner* — Said Broome
*Assistant Examiner* — Andrew Shin
(74) *Attorney, Agent, or Firm* — Keller Preece PLLC

(57) ABSTRACT

The present disclosure is directed toward systems, methods, and non-transitory computer readable media that provide a differentiable tiling system that generates aesthetically plausible, periodic, and tile-able non-square imagery using machine learning and a text-guided, fully automatic generative approach. Namely, given a textual description of the object and a symmetry pattern of the 2D plane, the system produces a textured 2D mesh which visually resembles the textual description, adheres to the geometric rules which ensure it can be used to tile the plane, and contains only the foreground object. Indeed, the disclosed systems generate a plausible textured 2D triangular mesh that visually matches the textual input and optimizes both the texture and the shape of the mesh and satisfy an overlap condition and a tile-able condition. Using the described methods, the differentiable tiling system generates the mesh such that the edges and the vertices align between repeatable instances of the mesh.

20 Claims, 13 Drawing Sheets

(56) References Cited

OTHER PUBLICATIONS

Adib Akl, Charles Yaacoub, Marc Donias, Jean-Pierre Da Costa, and Christian Germain. 2018. A survey of exemplar-based texture synthesis methods. Computer Vision and Image Understanding 172 (2018), 12-24.

Aditya Ramesh, Mikhail Pavlov, Gabriel Goh, Scott Gray, Chelsea Voss, Alec Radford, Mark Chen, and Ilya Sutskever. 2021. Zero-shot text-to-image generation. In International Conference on Machine Learning. PMLR, 8821-8831.

Ajay Jain, Amber Xie, and Pieter Abbeel. 2022b. VectorFusion: Text-to-SVG by Abstracting Pixel-Based Diffusion Models. arXiv (2022).

Ajay Jain, Ben Mildenhall, Jonathan T. Barron, Pieter Abbeel, and Ben Poole. 2022a. Zero-Shot Text-Guided Object Generation with Dream Fields. (2022).

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. Learning transferable visual models from natural language supervision. In International conference on machine learning. PMLR, 8748-8763.

Alejo Hausner. 2001. Simulating decorative mosaics. In Proceedings of the 28th annual conference on Computer graphics and interactive techniques. 573-580.

Alexei A Efros and Thomas K Leung. 1999. Texture synthesis by non-parametric sampling. In Proceedings of the IEEE/CVF International Conference on Computer Vision (ICCV), vol. 2. IEEE, 1033-1038.

Alexei A Efros and William T Freeman. 2001. Image quilting for texture synthesis and transfer. In Proceedings of the 28th annual conference on Computer Graphics and Interactive Techniques. 341-346.

Ben Poole, Ajay Jain, Jonathan T. Barron, and Ben Mildenhall. 2022. DreamFusion: Text-to-3D using 2D Diffusion. arXiv (2022).

Carlos Rodriguez-Pardo and Elena Garces. 2022. SeamlessGAN: Self-Supervised Synthesis of Tileable Texture Maps. IEEE Transactions on Visualization and Computer Graphics (2022).

Carlos Rodriguez-Pardo, Sergio Suja, David Pascual, Jorge Lopez-Moreno, and Elena Garces. 2019. Automatic extraction and synthesis of regular repeatable patterns. Computers and Graphics (Pergamon) 83 (10 2019), 33-41.

Chen-Hsuan Lin, Jun Gao, Luming Tang, Towaki Takikawa, Xiaohui Zeng, Xun Huang, Karsten Kreis, Sanja Fidler, Ming-Yu Liu, and Tsung-Yi Lin. 2023. Magic3D: High-Resolution Text-to-3D Content Creation. In IEEE Conference on Computer Vision and Pattern Recognition (CVPR).

Chi-Han Peng, Caigui Jiang, Peter Wonka, and Helmut Pottmann. 2019. Checkerboard patterns with black rectangles. (2019).

Chi-Han Peng, Yong-Liang Yang, and Peter Wonka. 2014. Computing layouts with deformable templates. ACM Transactions on Graphics (TOG) 33, 4 (2014), 1-11.

Chitwan Saharia, William Chan, Saurabh Saxena, Lala Li, Jay Whang, Emily L Denton, Kamyar Ghasemipour, Raphael Gontijo Lopes, Burcu Karagol Ayan, Tim Salimans, et al. 2022. Photorealistic text-to-image diffusion models with deep language understanding. Advances in Neural Information Processing Systems 35 (2022), 36479-36494.

Chi-Wing Fu, Chi-Fu Lai, Ying He, and Daniel Cohen-Or. 2010. K-set tilable surfaces. ACM transactions on graphics (TOG) 29, 4 (2010), 1-6.

Christian Schüller, Ladislav Kavan, Daniele Panozzo, and Olga Sorkine-Hornung. 2013. Locally injective mappings. In Computer Graphics Forum, vol. 32. Wiley Online Library, 125-135.

Craig S. Kaplan and David H. Salesin. 2000. Escherization. In Proceedings of the 27thAnnual Conference on Computer Graphics and Interactive Techniques (SIGGRAPH'00). ACM Press/Addison-Wesley Publishing Co., USA, 499-510. https://doi.org/10.1145/344779.345022.

David Smith, Joseph Samuel Myers, Craig S Kaplan, and Chaim Goodman-Strauss. 2023. An aperiodic monotile. arXiv preprint arXiv:2303.10798 (2023).

Diederik P Kingma and Jimmy Ba. 2014. Adam: A method for stochastic optimization. arXiv preprint arXiv:1412.6980 (2014).

Floris Laporte. 2022. Torch Sparse Solve. https://github.com/flaport/torch_sparse_solve.

Gal Metzer, Elad Richardson, Or Patashnik, Raja Giryes, and Daniel Cohen-Or. 2022. Latent-NeRF for Shape-Guided Generation of 3D Shapes and Textures. arXiv:2211.07600 (2022).

Gihyun Kwon and Jong Chul Ye. 2021. Clipstyler: Image style transfer with a single text condition. arXiv preprint arXiv:2112.00374 (2021).

Hanxiao Shen, Zhongshi Jiang, Denis Zorin, and Daniele Panozzo. 2019. Progressive Embedding. ACM Trans. Graph. 38, 4, Article 32 (Jul. 2019), 13 pages. https://doi.org/10.1145/3306346.3323012.

Hao Xu, Ka Hei Hui, Chi-Wing Fu, and Hao Zhang. 2020. TilinGNN: learning to tile with self-supervised graph neural network. arXiv preprint arXiv:2007.02278 (2020).

Haochen Wang, Xiaodan Du, Jiahao Li, Raymond A. Yeh, and Greg Shakhnarovich. 2022. Score Jacobian Chaining: Lifting Pretrained 2D Diffusion Models for 3D Generation. CVPR 2023 (2022).

Hiroshi Koizumi and Kokichi Sugihara. 2011. Maximum Eigenvalue Problem for Escherization. Graph. Comb. 27, 3 (May 2011), 431-439. https://doi.org/10.1007/s00373-011-1022-5.

Jason Smith and Scott Schaefer. 2015. Bijective parameterization with free boundaries. ACM Transactions on Graphics (TOG) 34, 4 (2015), 70.

Javier Portilla and Eero P Simoncelli. 2000. A parametric texture model based on joint statistics of complex wavelet coefficients. International Journal of Computer Vision 40, 1 (2000), 49-70.

Joep Moritz, Stuart James, Tom S.F. Haines, Tobias Ritschel, and Tim Weyrich. 2017. Texture stationarization: Turning photos into tileable textures. In Eurographics Symposium on Geometry Processing, vol. 36. 177-188. https://doi.org/10.1111/cgf.13117.

John H Conway, Heidi Burgiel, and Chaim Goodman-Strauss. 2008. The symmetries of things. Appl Math Comput 10 (2008), 12.

Jonathan Ho, Ajay Jain, and Pieter Abbeel. 2020. Denoising diffusion probabilistic models. Advances in Neural Information Processing Systems 33 (2020), 6840-6851.

Kaleigh Smith, Yunjun Liu, and Allison Klein. 2005. Animosaics. In Proceedings of the 2005 ACM SIGGRAPH/Eurographics symposium on computer animation. 201-208.

Kevin Frans, Lisa Soros, and Olaf Witkowski. 2022. Clipdraw: Exploring text-to-drawing synthesis through language-image encoders. Advances in Neural Information Processing Systems 35 (2022), 5207-5218.

Lara Raad, Axel Davy, Agnès Desolneux, and Jean-Michel Morel. 2018. A survey of exemplar-based texture synthesis. Annals of Mathematical Sciences and Applications 3, 1 (2018), 89-148.

Luke Melas-Kyriazi, Christian Rupprecht, Iro Laina, and Andrea Vedaldi. 2023. RealFusion: 360 Reconstruction of Any Object from a Single Image. In CVPR.

Marcel Campen, Claudio T Silva, and Denis Zorin. 2016. Bijective maps from simplicial foliations. ACM Transactions on Graphics (TOG) 35, 4 (2016), 1-15.

Matthias Müller, Nuttapong Chentanez, Tae-Yong Kim, and Miles Macklin. 2015. Air meshes for robust collision handling. ACM Transactions on Graphics (TOG) 34, 4 (2015), 1-9.

Max Wardetzky, Saurabh Mathur, Felix Kälberer, and Eitan Grinspun. 2007. Discrete Laplace operators: no free lunch. In Symposium on Geometry processing. Aire-la-Ville, Switzerland, 33-37.

Mayank Singh and Scott Schaefer. 2010. Triangle surfaces with discrete equivalence classes. In ACM SIGGRAPH 2010 papers. 1-7.

Michael Eigensatz, Martin Kilian, Alexander Schiftner, Niloy J Mitra, Helmut Pottmann, and Mark Pauly. 2010. Paneling architectural freeform surfaces. In ACM SIGGRAPH 2010 papers. 1-10.

Michael Floater. 2003. One-to-one piecewise linear mappings over triangulations. Math. Comp. 72, 242 (2003), 685-696.

Michael Rabinovich, Roi Poranne, Daniele Panozzo, and Olga Sorkine-Hornung. 2016. Scalable locally injective mappings. ACM Transactions on Graphics (TOG) 36, 4 (2016), 37a.

(56)        References Cited

OTHER PUBLICATIONS

Nasir Mohammad Khalid, Tianhao Xie, Eugene Belilovsky, and Popa Tiberiu. 2022. CLIP-Mesh: Generating textured meshes from text using pretrained image-text models. SIGGRAPH Asia 2022 Conference Papers (Dec. 2022).

Noam Aigerman and Yaron Lipman. 2015. Orbifold tutte embeddings. ACM Trans. Graph. 34, 6 (2015), 190-1.

Noam Aigerman and Yaron Lipman. 2016. Hyperbolic orbifold tutte embeddings. ACM Trans. Graph. 35, 6 (2016), 217-1.

Omer Bar-Tal, Lior Yariv, Yaron Lipman, and Tali Dekel. 2023. MultiDiffusion: Fusing Diffusion Paths for Controlled Image Generation. arXiv preprint arXiv:2302.08113 (2023).

Oscar Michel, Roi Bar-On, Richard Liu, Sagie Benaim, and Rana Hanocka. 2021. Text2Mesh: Text-Driven Neural Stylization for Meshes. arXiv preprint arXiv:2112.03221 (2021).

Patrick von Platen, Suraj Patil, Anton Lozhkov, Pedro Cuenca, Nathan Lambert, Kashif Rasul, Mishig Davaadorj, and Thomas Wolf. 2022. Diffusers: State-of-the-art diffusion models. https://github.com/huggingface/diffusers.

Prafulla Dhariwal and Alexander Nichol. 2021. Diffusion models beat gans on image synthesis. Advances in Neural Information Processing Systems 34 (2021), 8780-8794.

Robin Rombach, Andreas Blattmann, Dominik Lorenz, Patrick Esser, and Björn Ommer. 2021. High-Resolution Image Synthesis with Latent Diffusion Models. arXiv:2112.10752 [cs.CV].

Roger Penrose. 1974. The role of aesthetics in pure and applied mathematical research. Bull. Inst. Math. Appl. 10 (1974), 266-271.

Rui Chen, Yongwei Chen, Ningxin Jiao, and Kui Jia. 2023. Fantasia3D: Disentangling Geometry and Appearance for High-quality Text-to-3D Content Creation. arXiv preprint arXiv:2303.13873 (2023).

Samuli Laine, Janne Hellsten, Tero Karras, Yeongho Seol, Jaakko Lehtinen, and Timo Aila. 2020. Modular Primitives for High-Performance Differentiable Rendering. ACM Transactions on Graphics 39, 6 (2020).

Shahar Z Kovalsky, Noam Aigerman, Ronen Basri, and Yaron Lipman. 2014. Controlling singular values with semidefinite programming. ACM Trans. Graph. 33, 4 (2014), 68-1.

Steven J Gortler, Craig Gotsman, and Dylan Thurston. 2006. Discrete one-forms on meshes and applications to 3D mesh parameterization. Computer Aided Geometric Design 23, 2 (2006), 83-112.

Tero Karras, Miika Aittala, Samuli Laine, Erik Härkönen, Janne Hellsten, Jaakko Lehtinen, and Timo Aila. 2021. Alias-Free Generative Adversarial Networks. In Proc. NeurIPS.

Urs Bergmann, Nikolay Jetchev, and Roland Vollgraf. 2017. Learning texture manifolds with the Periodic Spatial GAN. (2017), 469-477.

Vivek Kwatra, Arno Schodl, Irfan Essa, Greg Turk, and Aaron Bobick. 2003. Graphcut textures: image and video synthesis using graph cuts. ACM Transactions on Graphics (ToG) 22, 3 (2003), 277-286.

Vivek Kwatra, Irfan Essa, Aaron Bobick, and Nipun Kwatra. 2005. Texture optimization for example-based synthesis. In ACM Transactions on Graphics (ToG), vol. 24. ACM, 795-802. https://doi.org/10.1145/1073204.1073263.

Weikai Chen, Yuexin Ma, Sylvain Lefebvre, Shiqing Xin, Jonàs Martínez, and Wenping Wang. 2017. Fabricable tile decors. ACM Transactions on Graphics (TOG) 36, 6 (2017), 1-15.

Weiming Dong, Ning Zhou, and Jean-Claude Paul. 2007. Optimized tile-based texture synthesis. In Proceedings of Graphics Interface 2007. 249-256.

William Gao, Noam Aigerman, Groueix Thibault, Vladimir Kim, and Rana Hanocka. 2023. TextDeformer: Geometry Manipulation using Text Guidance. In ACM Transactions on Graphics (SIGGRAPH).

William Thomas Tutte. 1963. How to draw a graph. Proceedings of the London Mathematical Society 3, 1 (1963), 743-767.

Xiao-Ming Fu and Yang Liu. 2016. Computing Inversion-Free Mappings by Simplex Assembly. ACM Transactions on Graphics (SIGGRAPH Asia) 35, 6 (2016).

Xilong Zhou, Milos Hasan, Valentin Deschaintre, Paul Guerrero, Kalyan Sunkavalli, and Nima Khademi Kalantari. 2022. TileGen: Tileable, Controllable Material Generation and Capture. In SIGGRAPH Asia 2022 Conference Papers. 1-9.

Xilong Zhou, Milos Hasan, Valentin Deschaintre, Paul Guerrero, Yannick Hold-Geoffroy, Kalyan Sunkavalli, and Nima Khademi Kalantari. 2023. PhotoMat: A Material Generator Learned from Single Flash Photos. In ACM SIGGRAPH 2023 Conference Proceedings (Los Angeles, CA, USA) (SIGGRAPH '23). Association for Computing Machinery, New York, NY, USA.

Yael Vinker, Ehsan Pajouheshgar, Jessica Y. Bo, Roman Christian Bachmann, Amit Haim Bermano, Daniel Cohen-Or, Amir Zamir, and Ariel Shamir. 2022. CLIPasso: Semantically-Aware Object Sketching. ACM Trans. Graph. 41, 4, Article 86 (Jul. 2022), 11 pages. https://doi.org/10.1145/3528223.3530068.

Yaron Lipman. 2012. Bounded distortion mapping spaces for triangular meshes. ACM Transactions on Graphics (TOG) 31, 4 (2012), 1-13.

Yuan-Chen Guo, Ying-Tian Liu, Chen Wang, Zi-Xin Zou, Guan Luo, Chia-Hao Chen, Yan-Pei Cao, and Song-Hai Zhang. 2023. threestudio: A unified framework for 3D content generation. https://github.com/threestudio-project/threestudio.

Yuichi Nagata and Shinji Imahori. 2021. Escherization with Large Deformations Based on As-Rigid-As-Possible Shape Modeling. ACM Trans. Graph. 41, 2, Article 11 (Nov. 2021), 16 pages. https://doi.org/10.1145/3487017.

Zhengqin Li, Mohammad Shafiei, Ravi Ramamoorthi, Kalyan Sunkavalli, and Manmohan Chandraker. 2020. Inverse rendering for complex indoor scenes: Shape, spatially-varying lighting and svbrdf from a single image. In Proceedings of the IEEE/CVF Conference on Computer Vision and Pattern Recognition (CVPR). 2475-2484.

Zhongshi Jiang, Scott Schaefer, and Daniele Panozzo. 2017. Simplicial complex augmentation framework for bijective maps. ACM Transactions on Graphics 36, 6 (2017).

Combined Search and Examination Report as received in United Kingdom Application No. 2407687.9 dated Oct. 10, 2024.

Ivan Lopes, Fabio Pizzati, and Raoul de Charette, "Material Palette: Extraction of Materials from a Single Image", In IEEE/CVF Conference on Computer Vision and Pattern Recognition, pp. 4379-4388, 2024, https://ieeexplore.ieee.org/document/10656907.

Noam Aigerman and Thibault Groueix, "Generative Escher Meshes", In SIGGRAPH '24: ACM SIGGRH 2024 Conference Papers Article No. 133, pp. 1-11, 2024, https://doi.org/10.1145/3641519.36574.

* cited by examiner

100

Server Device(s) *102*

Digital Content Management System *104*

Differentiable Tiling System *106*

Network *108*

Client Device(s) *110*

Client Application *112*

$$\sum_{j\in N^i} w_{ij}(v_i - v_j) = 0$$

820

810

"A Chinese dragon Head"

1100

Receiving A Textual Input Comprising A Subject For A Tile-Able Image *1102*

Generating A Mesh Comprising Edges And Vertices That Satisfy An Overlap Condition And A Tile-Able Boundary Condition *1104*

Generating A Rendered Image From The Mesh And A Dynamic Texture Image *1106*

Generating The Tile-Able Image By Modifying The Dynamic Mesh Weights And The Dynamic Texture Image *1108*

Receiving An Input Indicating A Subject *1202*

Generating A Mesh Comprising Edges And Vertices And Imposing An Overlap Condition And A Tile-Ability Boundary Condition *1204*

Generating A Measure Of Loss By Comparing The Mesh To A Digital Representation Of The Subject *1206*

Generating The Repeatable Tile By Modifying The Dynamic Mesh Weights Based On The Measure Of Loss *1208*

GENERATING TILE-ABLE IMAGES UTILIZING A DIFFERENTIABLE MESH GENERATION AND RENDERING PIPELINE

BACKGROUND

Advancements in computing devices and computer design applications have given rise to a variety of innovations in computer image creation and editing software. For example, image design systems have developed that provide tools for creating and integrating variants of design elements within digital images. Some computer design applications can manipulate digital images as part of a design process to create digital images composed of repetitive design elements. However, partially due to the complexity inherent in such image manipulation, it can be difficult for computer systems to manipulate the geometry and appearance of individual non-square objects in a way that they can be combined as tiles in an interdependent and visually consistent manner. Accordingly, the state of the art exhibits a number of shortcomings with regard to flexibility, accuracy, and computational efficiency when creating, editing, and manipulating tile-able digital images.

SUMMARY

One or more embodiments provide benefits and/or solve one or more of the foregoing or other problems in the art with systems, methods, and non-transitory computer readable storage media that provide a system for creating and modifying a digital depiction of a subject to provide a periodic, repeatable, and plausible design that is tile-able within two-dimensional space. In particular, in one or more implementations, the disclosed systems optimize both the geometry and color of a 2D mesh, in order to generate a non-square tile in the shape and appearance of the desired subject (e.g., without additional background details). For example, the disclosed systems perform a geometric optimization of a tile by generating an unconstrained, differentiable parameterization of the space of all possible tile-able shapes within a symmetry group. In one or more embodiments, the disclosed systems utilize dynamic edge weights of a mesh generation model and a texture image as optimizable parameters to generate a tile-able textured mesh. In particular, the disclosed systems can utilize dynamic edge weights of a mesh generation model to generate a mesh that satisfies an overlap condition (i.e., non-overlapping edges and vertices) and a tile-able boundary condition (i.e., that boundaries of the edge can fit together in a repeatable pattern). Moreover, the disclosed systems utilize a differentiable renderer to generate a rendered image from the mesh and a texture image. In some cases, the disclosed systems utilize a trained image diffusion model and determine a loss between the rendered image and a representation of the desired subject to update the dynamic edge weights for the mesh and the texture image. By iteratively updating the dynamic edge weights and the texture image based on this measure of loss, in one or more implementations, the disclosed systems produce a plausible and visually appealing tile-able digital design reflecting the desired subject.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
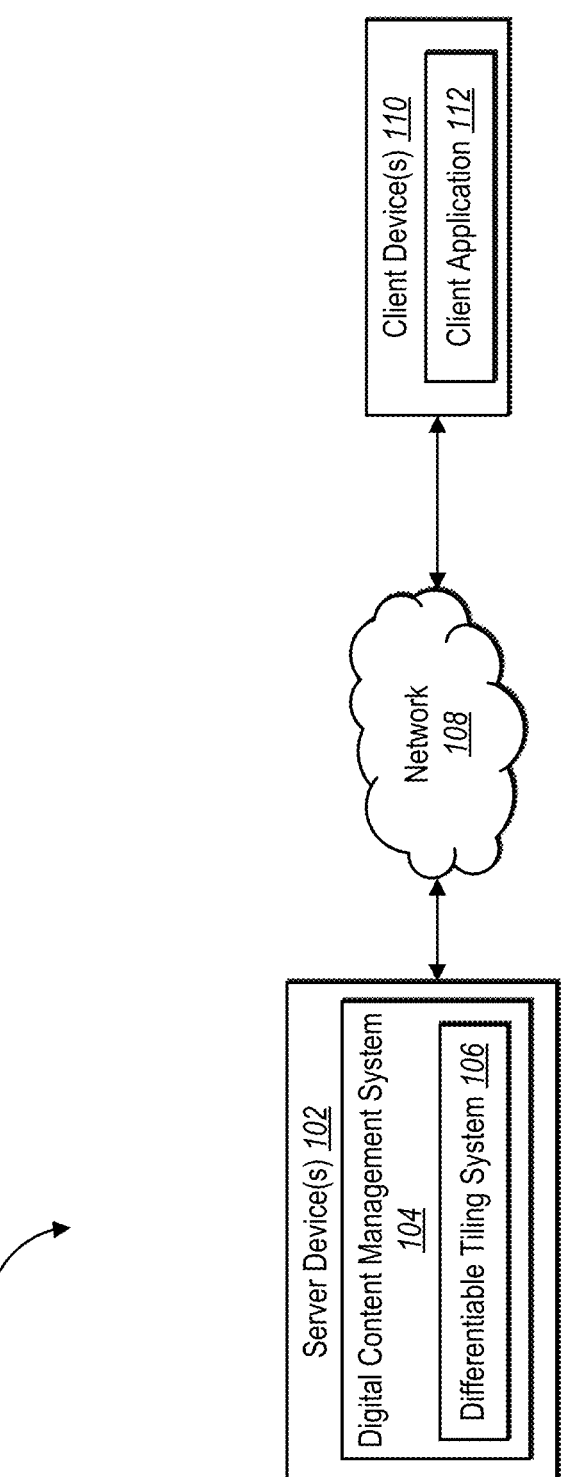
FIG. 1 illustrates a schematic diagram of an example environment of a differentiable tiling system in accordance with one or more embodiments.

This disclosure describes one or more embodiments of a differentiable tiling system that utilizes a text-guided, fully automatic generative approach to generate aesthetically plausible, periodic, and tile-able non-square imagery through the use of machine learning. For example, given a desired textual description of the object and the desired symmetry pattern of the 2D plane, the system produces a textured 2D mesh which visually resembles the textual description, adheres to the geometric rules which ensure it can be used to tile the plane, and contains only the foreground object (to produce a tiling effect similar to Escher's works). In contrast, conventional tiling systems have a number of technical shortcomings with regard to flexibility, accuracy, and computational efficiency when creating tileable graphical objects.

In particular, many conventional tiling systems lack flexibility/functionality. For example, many conventional systems simply use a fixed set of tiles aligned in different ways. To illustrate, many conventional systems utilize trivially tile-able images such as a square (or a rectangle) or fixed tile-able shapes whose boundaries cannot be modified to accommodate for the desired object (e.g., wallpaper). In particular, conventional systems are geared towards the goal of turning an existing shape into a tile, and not towards obtaining a combination of geometric and textural optimization (e.g., via perceptual losses or another measure of loss).

Conventional systems are also inflexible when attempting to modify image geometries to create tile-able images. For example, some conventional systems define a tiling polygon comprised of a fixed, small set of tiling vertices and divide the edges with shape vertices. However, these systems only define a tiling polygon and do not directly ensure the shape vertices (necessary for achieving more elaborate shapes) form a boundary which is free of self-overlaps. Notably, these methods are geared towards the goal of turning an existing shape into a tile. Indeed, none of these conventional systems provide the flexibility to optimize one tile for a specific perceptual appearance (optimize both the texture as well as the actual shape of the tile) while ensuring it tiles the plane.

Conventional tiling systems also have a number of technical shortcomings with regard to computational efficiency when generating tile-able mesh embeddings. For example, some conventional energy-based methods for ensuring overlap-free mesh embeddings provide a barrier term which prevents triangles from inverting and the boundary from self-overlapping. However, the barrier term exhibits extremely large amplitudes and produces large gradients which interfere with the calculation of a measure of loss. Furthermore, these conventional energy-based methods require performing a line search as well as collision detection on the boundary, significantly increasing the run time. Other systems attempt to generate tile-able mesh embeddings through convexification methods that restrict the space of possible embeddings which requires computationally slow optimization techniques.

Furthermore, conventional systems are also inaccurate. Indeed, conventional systems often generate digital images with gaps or large background regions between tile-able shapes. For instance, conventional systems optimize colors over a square image, which leads to images which contain an object in the foreground but also have a background making the tiling effect of the entire square image trivial. Thus, conventional systems often inaccurately generate images that fail to align boundaries defining a particular foreground subject in a perpetually repeating manner.

In contrast, in some embodiments, the differentiable tiling system accepts a textual input (or other input indicating a subject) and generates a periodic, repeatable, and plausible textured 2D triangular mesh that visually matches the textual input and optimizes both the texture and the shape of the mesh. As mentioned, in one or more embodiments, the differentiable tiling system ensures that the mesh edges and vertices satisfy an overlap condition and a tile-able condition. In particular, in one or more implementations, the disclosed systems optimize both the geometry and texture of a 2D mesh, in order to generate a repeatable tile in the shape and appearance of the desired subject (e.g., of diverse geometries), with close to no additional background details. For example, the disclosed systems perform a geometric optimization of a tile by generating an unconstrained, differentiable parameterization of the space of all possible tile-able shapes within a symmetry group.

For example, the differentiable tiling system utilizes dynamic edge weights of a mesh generation model to guarantee non-overlapping boundary edges and non-overlapping interior edges. In particular, the differentiable tiling system satisfies the tile-able boundary condition such that the mesh can be repeated indefinitely with boundaries defined by the edges and the vertices aligning between all instances of the mesh. In one or more embodiments, the differentiable tiling system utilizes dynamic edge weights to generate a mesh that satisfies the overlap condition and the tile-able boundary condition.

Furthermore, in one or more embodiments, the differentiable tiling system utilizes a dynamic texture image and differentiable renderer to create a rendered image from the generated mesh. For instance, the differentiable tiling system generates a rendered image and compares the rendered image with a representation of the desired subject of the tile-able image. To illustrate, the differentiable tiling system utilizes a diffusion neural network to generate a digital image from a text input describing the desired subject of the tile-able image. The differentiable tiling system determines a measure of loss between the rendered image and the visual representation of the desired subject. In one or more implementations, the differentiable tiling system uses the measure of loss to update dynamic edge weights of the mesh generation model and/or the texture image to iteratively generate a feasible, tile-able image that accurately reflects the subject of the input text.

Thus, in one or more embodiments, the disclosed systems utilize a mesh and texture image as optimizable parameters to generate a tile-able textured mesh utilizing a differentiable renderer. In certain cases, the differentiable tiling system randomizes a background color for the dynamic texture image generated by the differentiable renderer to determine a measure of loss accurately between the rendered image and a vector representation of the textual input. In certain embodiments, the differentiable tiling system utilizes one learning rate to update the dynamic edge weights and a second learning weight to update the dynamic texture image. In particular, the differentiable tiling system modifies the dynamic edge weights of a differentiable mesh generation model utilizing gradient optimization to update the dynamic edge weights in a progressive manner. Using the described methods, the differentiable tiling system generates the mesh such that the edges and the vertices align between repeatable instances of the mesh.

As suggested above, embodiments of the differentiable tiling system can provide a variety of advantages over conventional tiling systems. For instance, the differentiable tiling system can improve operational flexibility. In contrast to conventional systems, given a text prompt (or other input indicating a subject), the differentiable tiling system can provide a textured mesh that visually matches the text, is comprised (solely) of the desired object with little to no background, and is tile-able. Indeed, in contrast to conventional systems use of a set of fixed tiles and restricted shapes, the differentiable tiling system can generate a non-square geometric shape that can be repeated infinitely without any gaps or overlaps to map the plane and contains the desired foreground object.

In addition, the differentiable tiling system can provide improved computational efficiency by forming the highly non-convex, restricted space of possible mesh configurations into an unconstrained, differentiable representation that satisfies the conditions of a non-overlapping boundary and is free of self-overlaps. This approach enables the differentiable tiling system to apply an unconstrained gradient-based optimization, while also ensuring the mesh is a valid tile. Unlike conventional methods used to restrict the space of possible embeddings which produce large gradients, the differentiable tiling system can generate a mesh that is overlap-free while enforcing periodic boundary constraints by utilizing a computationally efficient gradient-based optimization of a perceptual loss. Indeed, the differentiable tiling system can utilize a computationally efficient generative method for tilings formed by quotients of symmetry groups (e.g., produced by repeatedly applying a finite set of transformations to one tile).

Furthermore, in one or more implementations, the differentiable tiling system improves accuracy by generating tile-able images that reflect the contents of a particular input modality. For example, the differentiable tiling system generates tile-able images with complex, non-trivial boundaries that align to form a repeated pattern. Thus, the differentiable tiling system avoids gaps or background regions that do not accurately align the boundaries of the tile-able image to a foreground object/subject. Furthermore, by utilizing a measure of loss and differentiable pipeline, the differentiable tiling system generates tile-able images that accurately reflect the particular input prompts describing the desired subject of the tile-able image.

Additional detail regarding the differentiable tiling system will now be provided with reference to the figures. For example, FIG. 1 illustrates a schematic diagram of an exemplary system environment ("environment") 100 in which a differentiable tiling system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the differentiable tiling system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 13). Moreover, the server device(s) 102 and client device(s) 110 include one of a variety of computing devices (including one or more computing devices as discussed in greater detail with relation to FIG. 13).

As illustrated in FIG. 1, the environment 100 includes the server device(s) 102. The server device(s) 102 generates, tracks, stores, processes, receives, and transmits electronic data, including tile-able images. For example, the server device(s) 102 receives or monitors interactions across the client device(s) 110. In some implementations, the server device(s) 102 transmits content to the client device(s) 110 to cause the client device(s) 110 to display content associated with tile-able images. For example, the server device(s) 102 can present a digital mesh and/or tile-able image to client device(s) 110 and display a digital mesh and/or tile-able image on the client device(s) 110 with the digital mesh and/or tile-able image displayed corresponding to system need (e.g., provide a tile-able image for display via client application(s) 112).

Additionally, the server device(s) 102 includes all, or a portion of, the differentiable tiling system 106. For example, the differentiable tiling system 106 operates on the server device(s) 102 to access digital content (including digital meshes and/or tile-able images), determine digital content changes, and provide localization of content changes to the client device(s) 110. In one or more embodiments, via the server device(s) 102, the differentiable tiling system 106 generates and displays digital meshes and/or tile-able images based on the modification of edge weights for the digital meshes. Example components of the differentiable tiling system 106 will be described below with regard to FIG. 10.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 13. Some embodiments of client device(s) 110 are operated by a user to perform a variety of functions via respective client application(s) 112 such as the generation and modification of tile-able images. The client device(s) 110 include one or more applications (e.g., the client application(s) 112) that can access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

The differentiable tiling system 106 can be implemented in whole, or in part, by the individual elements of the environment 100. Indeed, as shown in FIG. 1 the differentiable tiling system 106 can be implemented with regard to the server device(s) 102 and the client device(s) 110. In particular embodiments, the differentiable tiling system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the differentiable tiling system 106 on the client device(s) 110 represents and/or provides the same or similar functionality as described herein in connection with the differentiable tiling system 106 on the server device(s) 102. In some implementations, the differentiable tiling system 106 on the server device(s) 102 supports the differentiable tiling system 106 on the client device(s) 110.

In some embodiments, the differentiable tiling system 106 includes a web hosting application that allows the client device(s) 110 to interact with content and services hosted on the server device(s) 102. To illustrate, in one or more implementations, the client device(s) 110 accesses a web page or computing application supported by the server device(s) 102. The client device(s) 110 provides input to the server device(s) 102 (e.g., selected content items). In response, the differentiable tiling system 106 on the server device(s) 102 generates/modifies digital content. The server device(s) 102 then provides the digital content to the client device(s) 110.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

As previously mentioned, in one or more embodiments, the differentiable tiling system 106 creates and modifies a digital depiction of a subject to provide a periodic, repeatable, and plausible design that is tile-able within two-dimensional space. For instance, FIG. 2 an example overview of using the differentiable tiling system 106 to generate a tile-able image in accordance with one or more embodiments. Additional detail regarding the various acts of FIG. 2 is provided thereafter with reference to subsequent figures.

Figure 2:
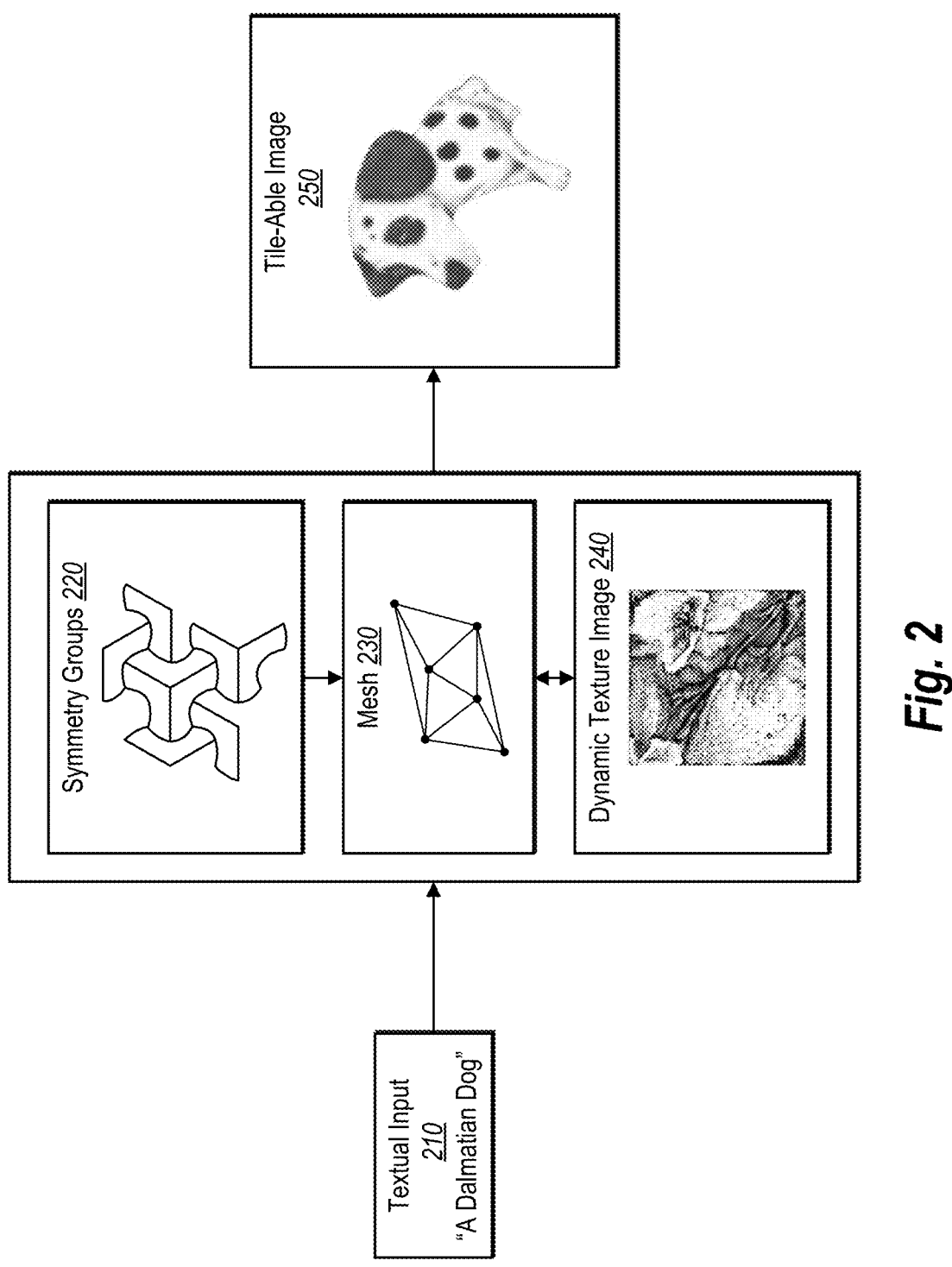
FIG. 2 illustrates an example overview of using a differentiable tiling system to generate a tile-able image in accordance with one or more embodiments.

As shown in FIG. 2, the differentiable tiling system 106 receives a textual input 210 and generates a tile-able image 250. In one or more embodiments, textual input 210 refers to a given text prompt that includes a textual description of a concept or object. Furthermore, the textual input 210 refers to a subject (e.g., object or concept) that is a visually identifiable entity. A subject represents a concept, item, element, or object that can be recognized by its visual characteristics and attributes. The differentiable tiling system 106 utilizes subjects that range from everyday items such as flowers, books, and fruits to more complex entities like animals, vehicles, and people. As shown, in some embodiments, textual input 210 includes a subject and adjective such as the textual input 210 of "A dalmatian dog." In certain embodiments, the textual input 210 can include additional information such as both instructions for the desired visual style as well as other context or constraints related to the subject.

Furthermore, the tile-able image 250 refers to visual representation (e.g., an image or mesh) that can be repeated or tiled. In particular, a "tile-able" image includes a non-square image or mesh that can be iteratively repeated such that the borders align in a repeatable pattern (e.g., without showing any visible seams or interruptions, creating the illusion of a continuous and uninterrupted image). For example, a tile-able image can be copied when to achieve a complete coverage of a 2D plane, without any overlaps between any two copies of the tile (including self-overlaps of the tile with itself) and without space in between any two copies of the tile.

As illustrated in FIG. 2, the differentiable tiling system 106 utilizes the textual input 210 to determine an object (e.g., subject) used to generate a textured 2D triangular mesh (e.g., mesh 230). For example, the differentiable tiling system 106 generates a textured 2D triangular mesh that visually resembles an object denoted by the textual input 210. As shown, the differentiable tiling system 106 utilizes the textual input 210 of "A dalmatian dog" to generate the tile-able image 250 that resembles a dalmatian dog and is tile-able. Indeed, using a trained diffusion model, the differentiable tiling system 106 optimizes the shape of an object denoted by the textual input 210, while respecting the constraint that the shape of the object is tile-able. Further, the differentiable tiling system 106 optimizes both the texture (e.g., visual appearance), as well as the actual shape (e.g., geometry) of the tile, while maintaining its tile-ability. The differentiable tiling system 106 optimizes both the geometry and the texture of the image. Indeed, this approach avoids optimizing colors/texture over a square image, which leads to images which contain the object in their foreground, but also have a background, making the tiling effect of the entire square image trivial. For example, the differentiable tiling system 106 utilizes an interaction between the geometry and the texture to enable the differentiable tiling system 106 to determine a tile-able image that contains little to no background.

As further shown, the differentiable tiling system 106 optimizes the shape utilizing symmetry groups 220. In particular, the differentiable tiling system 106 utilizes symmetry groups 220, which indicate different isometries for tiles of a 2D plane. For example, the differentiable tiling system 106 utilizes a generative method for tilings formed by quotients of symmetry groups by repeatedly applying a finite set of transformations to one tile. In this way, the differentiable tiling system 106 can generate tiles that encompass almost all Euclidean tilings (e.g., such as the tilings produced by Escher).

In particular, in one or more implementations, the differentiable tiling system 106 optimizes the mesh's shape while maintaining its ability to tile the plane with no two copies of the mesh overlapping one another. In addition, the differentiable tiling system 106 generates the mesh 230 such that it is free of self-overlaps (e.g., the boundary does not self-overlap and no triangles of the mesh are inverted). Indeed, the differentiable tiling system 106 converts the non-convex, restricted space of possible mesh configurations that are tile-able and are overlap free into an unconstrained, differentiable representation of the mesh. In particular, the differentiable tiling system 106 bijectively maps the triangular mesh into a 2D shape that can tile the plane by modifying the edge-weights of the mesh.

As further shown, the differentiable tiling system 106 textures the mesh 230 embedding using a dynamic texture image 240 (e.g., an optimizable texture image). The dynamic texture image 240 indicates a visual appearance of the tile-able image 250. In particular, the differentiable tiling system 106 wraps or maps the dynamic texture image 240 to the mesh 230 to give the mesh 230 a visual appearance (e.g., color, hue, shading) that reflects an input prompt. As discussed in greater detail below, the differentiable tiling system 106 utilizes a renderer (e.g., a differential renderer) to generate a rendered image from the mesh 230 and the dynamic texture image 240. The differentiable tiling system 106 utilizes this rendered image to modify the mesh 230 and the dynamic texture image 240 to align to the textual input 210. Thus, the differentiable tiling system 106 iteratively modifies the mesh 230 (according to a particular symmetry group) and the dynamic texture image 240 based on a measure of loss between a rendered image and a representation of the textual input.

As shown, the differentiable tiling system 106 determines a non-square geometric tile (e.g., the mesh 230) that can be repeated infinitely without gaps or overlaps to map the plane, wherein the tile contains solely the desired foreground object. Furthermore, the differentiable tiling system 106 generates the tile such that the boundary of each tile is the contour of the desired object. In this way, the differentiable tiling system 106 generates the tile-able image 250 that is a plausible, tile-able representation of the desired object. For example, the differentiable tiling system 106 generates a tile-able image 250 that is geometrically a pattern that adheres to the designated layout, connects with itself seamlessly, and repeat continuously ad-infinitum. In addition, the differentiable tiling system 106 generates a tile-able image 250 that is perceptually a plausible, tile-able representation of the desired object, while also presenting visual appeal.

Figure 3:
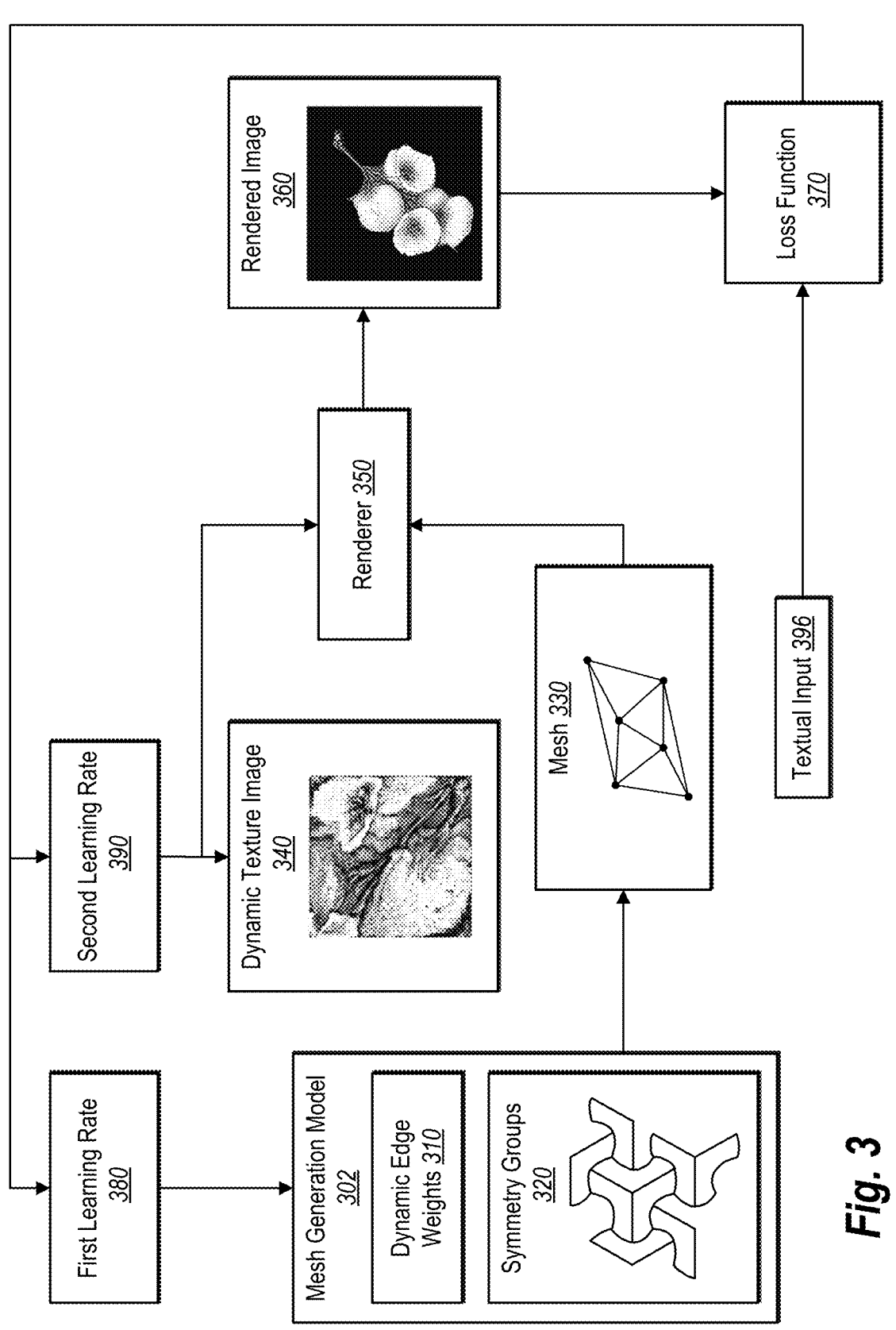
FIG. 3 illustrates an example of utilizing a mesh, texture image, and loss function to generate a tile-able image in accordance with one or more embodiments.

As previously mentioned, in one or more embodiments, the differentiable tiling system 106 creates and modifies a digital depiction of a subject utilizing a differentiable renderer. FIG. 3 illustrates an example of a differentiable render utilizing a mesh, texture image, and loss function to generate a tile-able image in accordance with one or more embodiments.

As shown, the mesh generation model 302 utilizes dynamic edge weights 310 in conjunction with symmetry groups 320. In particular, the mesh generation model 302 utilizes the symmetry groups 320 to generate a mesh that can be copied and shifted to cover a plane without any overlaps between the copies of the mesh. In the context of the differentiable tiling system 106, dynamic edge weights refer to changing or adaptive weights corresponding to connections between nodes in a mesh. For example, the dynamic edge weights 310 represent the weights or strengths between nodes/vertices utilized to generate the resulting geometry of a mesh. For example, the mesh generation model 302 utilizes a generative method utilizing dynamic edge weights 310 and symmetry groups 320 to generate tilings formed by quotients of the symmetry groups 320 (e.g., produced by repeatedly applying a finite set of transformations to one tile).

To illustrate, by modifying the dynamic edge weights of a Laplacian used to modify the symmetry groups 320, the mesh generation model 302 utilizes a differentiable mesh generation model and can represent any tile-able mesh configuration (and only valid tile-able configurations) for some choice of dynamic edge weights 310. Differentiability of the mesh generation model 302 allows the differentiable tiling system 106 to utilize gradient-based optimization technique and backpropagation to update the dynamic edge weights based on a measure of loss. Thus, a differentiable mesh generation model refers to a model that utilizes a continuous function where a gradient (or derivative) exists within the domain (e.g., for applying gradient optimization techniques). Further, because the vertices of the mesh 330 are differentiable with respect to the dynamic edge weights 310, the mesh generation model 302 obtains an unconstrained, differentiable representation of all possible valid tile geometries corresponding to the symmetry groups 320. In one or more embodiments, the mesh generation model 302 utilizes symmetry groups such as the seventeen discrete symmetry groups (e.g., wallpaper groups) described by John H Conway, Heidi Burgiel, and Chaim Goodman-Strauss in The Symmetries of Things, 2008, incorporated by reference herein in its entirety. The differentiable tiling system 106 can utilize a subset of these symmetry groups (or different symmetry groups) depending on the embodiment.

As further shown, the mesh generation model 302 determines a mesh 330 that satisfies an overlap condition and a tile-able boundary condition (e.g., is tile-able). As used herein, an overlap condition for a tile-able object refers to a mesh property where portions of the mesh do not overlap or intersect (e.g., at the edges). Thus, when the object is tiled or repeated to cover a larger area, the individual instances fit together without any visual inconsistencies or overlaps. Further, a tile-able boundary condition refers to a property that allows the object to seamlessly repeat or replicate itself with aligned boundaries (e.g., repeated across a plane without creating noticeable seams or disruptions at the boundary). For example, the boundary condition ensures indicates that the tile-able object can be placed adjacent to its copies in a way that maintains continuity and coherence at the boundary (to provide a seamless tile-able pattern or texture). To illustrate, the differentiable tiling system 106 generates the mesh 330 that can be copied to new positions to achieve a complete coverage of the 2D plane, without any overlaps between any two copies of the mesh 330 and without any self-overlaps of the mesh 330 with itself. Indeed, the differentiable tiling system 106 generates a mesh 330 that satisfies these two constraints and is tile-able. Additional detail regarding the overlap condition and a tile-able boundary condition is provided below with reference to FIG. 4 and FIG. 5.

In order to represent a textured tile, the differentiable tiling system 106 selects an initial mesh. The differentiable tiling system 106 can utilize any valid tile as a possible mesh, without limitation (e.g., a regular triangulation of a square or rhombus). The differentiable tiling system 106 uses the initial tile vertex coordinates as the vertices' UV coordinates (to wrap the 3D surface onto a flat 2D plane while preserving the spatial relationships), which the differentiable tiling system 106 keeps static throughout optimization. In particular, the differentiable tiling system 106 optimizes the mesh 330 geometry through modifying the edge weights to determine the vertices of the mesh 330.

For example, to represent the infinite repeating tiling of the mesh 330, the differentiable tiling system 106 utilizes a single tile T represented as a 2D triangular mesh with vertices V and triangles T. The differentiable tiling system 106 utilizes a fixed, finite set of isometric 2D transformations (e.g., as defined by one of the symmetry groups 320) represented as periodic boundary conditions, which define the desired tiling pattern. For example, when applied repeatedly to the mesh 330, the transformations defined by the symmetry groups 320 copy the mesh 330 to new positions to achieve a complete coverage of the 2D plane, without any overlaps between any two copies of the mesh 330 and without any self-overlaps of the mesh with itself. Indeed, the differentiable tiling system 106 generates a mesh 330 that satisfies these two constraints and is tile-able.

Additionally, the differentiable tiling system 106 textures the mesh embedding using an optimizable texture image. In particular, the differentiable tiling system 106 utilizes a dynamic texture image 340 to assign a color (or greyscale) to every point on the tile via predetermined UV coordinates. For example, the differentiable tiling system 106 wraps or maps the dynamic texture image 340 to the mesh 330 to give the mesh 230 a visual appearance (e.g., color, hue, shading) that reflects an input prompt. Further, the differentiable tiling system 106 textures the mesh using UV mapping to assign two-dimensional coordinates to the vertices of the mesh 330 utilizing the dynamic texture image 340 to determine how the texture will be applied to the mesh 330 surface. In certain embodiments, the differentiable tiling system 106 optimizes the values of the dynamic texture image 340 to adjust and enhance the colors, contrasts, brightness, and other visual attributes of the dynamic texture image 340. As mentioned, the differentiable tiling system 106 utilizes the dynamic texture image 340 to generate textures for the tile that represent the desired object and where the boundary of each tile is the contour of the object.

As further shown, the differentiable tiling system 106 renders the image using a renderer 350. In particular, the differentiable tiling system 106 utilizes the renderer 350 to generate the rendered image 360 from a textual input 396. For example, the renderer includes a computer implemented model that combines texture images and meshes to generate a rendering (e.g., a rendered image). For instance, a renderer can include a computer-implemented algorithm that simulates the way light interacts with surfaces, materials, and objects to produce a 2D image that portrays the rendered image 360 realistically and/or stylistically based upon the textual input 396. In particular, the differentiable tiling system 106 combines the textured image 340 and the mesh 330 to generate the rendered digital image 360 (e.g., utilizes UV coordinates to map the textured image 340 to the mesh 330).

In certain embodiments, the renderer 350 is a differentiable renderer. For example, the differentiable renderer is a renderer that allows gradients to be determined and propagated through images. To illustrate, a differentiable renderer models a rendering through a continuous function such that a derivative (or gradient) can be determined and utilized for optimization. For example, in some implementations, the differentiable tiling system 106 utilizes the differentiable renderer described by Samuli Laine, Janne Hellsten, Tero Karras, Yeongho Seol, Jaakko Lehtinen, and Timo Aila. 2020 in Modular Primitives for High-Performance Differentiable Rendering, ACM Transactions on Graphics 39, 6 (2020), which is incorporated by reference in its entirety herein. The differentiable tiling system 106 can utilize a variety of different differentiable renderers.

Thus, by utilizing a differentiable renderer, the differentiable tiling system 106 can optimize parameters using gradient-based optimization algorithms (e.g., gradient descent), to produce the best fit between the rendered image 360 and a target image (based on the given textual input 396). As mentioned, the differentiable tiling system 106 jointly optimizes both the mesh 330 geometry via its vertices, and its colors via the dynamic texture image 340 utilizing a gradient-based optimization of perceptual loss. The renderer 350 ensures that color and shape cooperate with one another to produce a tile that contains only the desired foreground imagery (which avoids the trivial solution of a square tile which tiles an image of the object with a background color).

As further shown, to optimize the rendered image 360 appearance to match the given textual input 396, the differentiable tiling system 106 utilizes a loss function 370 to iteratively determine a measure of loss (e.g., differentiable loss). In particular, the differentiable tiling system 106 determines the loss utilizing a perceptive module or directly from the mesh's geometry. For example, in certain embodiments, the differentiable tiling system 106 leverages a pretrained diffusion model to define a loss. In this way, the differentiable tiling system 106 utilizes text-guidance from a diffusion model to optimize the mesh 330 appearance to match the textual input 396. To illustrate, in some embodiments, the differentiable tiling system 106 injects the rendered image 360 into a diffusion process by adding noise to the rendered image 360 and then applying a denoising step, conditioned on the desired textual input 396.

Specifically, during denoising, the differentiable tiling system 106 utilizes an embedding model to generate a representation (e.g., a vector representation) of the textual input 396 (or a different input prompt). The differentiable tiling system 106 also utilizes a first step of a trained diffusion neural network to generate a partially denoised image representation from a noise representation (e.g., from the noisy representation of the rendered image 360) conditioned on the vector representation of the textual input 396. The differentiable tiling system 106 can iteratively utilize additional steps (e.g., a second step, third step, through a thousandth step) of diffusion neural networks conditioned on the vector representation of the text input to generate a representation (e.g., image representation) of the textual input 396. The differentiable tiling system 106 can utilize a variety of generative models (e.g., GAN, diffusion models, or other generative machine learning models) to generate a representation of an input prompt and determine a measure of loss.

Thus, the differentiable tiling system 106 obtains a modified version of the input image (e.g., a modified rendered image 360) that is more correlated to the given textual input 396. Further, the differentiable tiling system 106 generates a loss via the loss function 370 as the difference between rendered image 360 and the modified rendered image. The differentiable tiling system 106 can utilize a variety of different loss functions. For example, the differentiable tiling system 106 can utilize a loss function such as mean squared error loss (MSE), mean absolute error loss, binary cross-entropy loss, categorical cross-entropy loss, sparse categorical cross-entropy loss, hinge loss, Huber loss, and/or Kullback-leibler divergence.

In one or more implementations, the differentiable tiling system 106 utilizes a generative approach for generating images from a given text prompt. In particular, the differentiable tiling system 106 turns a trained diffusion model into a prior which can be used as a loss in a traditional optimization setting. In this way, the differentiable tiling system 106 optimizes the shape of objects from text, respecting the constraint that the shapes should be tile-able. As mentioned, the differentiable tiling system 106 can utilize a variety of different loss functions or losses to generate a tile-able image. In one or more embodiments, the differentiable tiling system 106 utilizes score distillation sampling as described by Ben Poole, Ajay Jain, Jonathan T. Barron, and Ben Mildenhall in DreamFusion: Text-to-3D using 2D Diffusion, 2022, which is incorporated by reference herein in its entirety.

As further shown, the differentiable tiling system 106 modifies the dynamic texture image 340 and the dynamic edge weights 310 based on the measure of loss 370. For example, because the pipeline utilized to determine the measure of loss is differentiable, the differentiable tiling system 106 can utilize back propagation and/or gradient optimization to modify the dynamic texture image 340 and the dynamic edge weights 310 toward a more optimal solution. Over various iterations, the dynamic texture image 340 and the dynamic edge weights 310 can converge to generate a tile-able image that accurately aligns to the input prompt.

As shown in FIG. 3, in one or more implementations, the differentiable tiling system 106 utilizes different rates for the geometric optimization (the first learning rate 380) and the texture optimization (the second learning rate 390). In particular, the differentiable tiling system 106 utilizes the learning rates to set a hyperparameter that determines the step size at which the mesh generation model 302 and the renderer 350 adjust their internal parameters during the training process. Utilizing this approach, the differentiable tiling system 106 can control the magnitude of the parameter adjustments in each iteration.

Indeed, by modifying the first learning rate 380 and the second learning rate 390, the differentiable tiling system 106 controls how quickly or slowly both the mesh generation model 302 and the renderer 350 converge to a desired solution. In certain embodiments, the differentiable tiling system 106 utilizes the same learning rate for the first learning rate 380 and the second learning rate 390. In these embodiments, the differentiable tiling system 106 generates the final textures and the geometric shape at the same rate to determine the textured mesh. In one or more embodiments, the differentiable tiling system 106 independently controls the convergence rates for the mesh generation model 302 and the renderer 350 by utilizing the first learning rate 380 and the second learning rate 390. To illustrate, the differentiable tiling system 106 utilizes a higher learning rate for the geometric optimization (e.g., 0.1) and a lower learning rate for the texture optimization (e.g., 0.01). In these embodiments, by setting a higher learning rate for the geometric optimization than for the texture optimization, the differentiable tiling system 106 forces the final textures to emerge slower and gives the optimized geometric shape time to form. In this way, given a text prompt, the differentiable tiling system 106 produces a textured mesh that visually matches the text, comprises the desired object with little to no background, and is tile-able.

Figure 4:
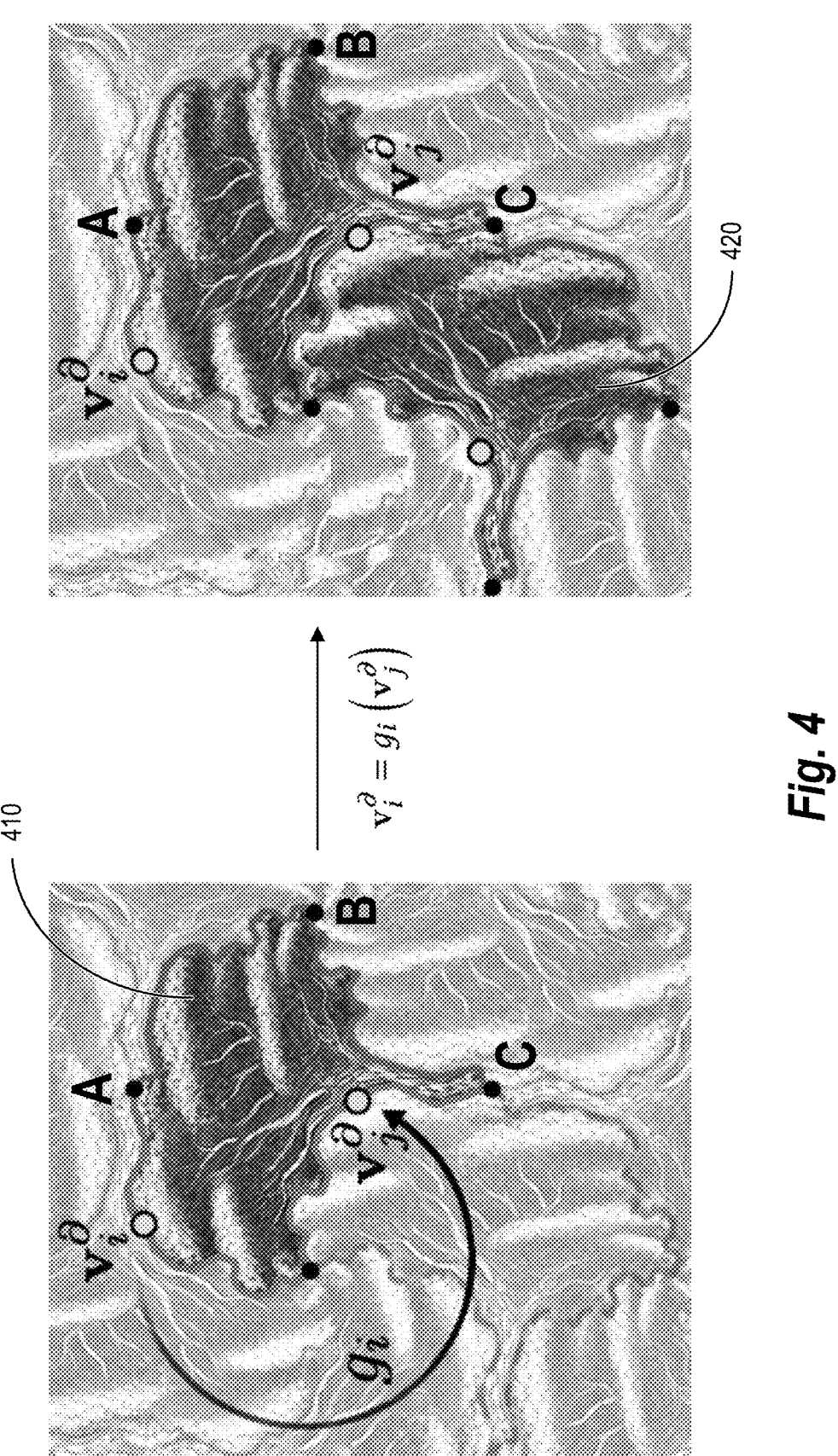
FIG. 4 illustrates mapping a tile-able image utilizing a tile-able boundary condition in accordance with one or more embodiments.

As mentioned, the differentiable tiling system 106 maps tile-able images to create tiles using translated and rotated copies of a single, textured 2D mesh. FIG. 4 illustrates mapping a tile-able image utilizing a tile-able boundary condition in accordance with one or more embodiments.

FIG. 4 illustrates the differentiable tiling system 106 utilizing symmetry groups to map translated and rotated copies of meshes to a tile. In particular, the differentiable tiling system 106 utilizes symmetry groups that represent the set of all symmetry transformations that preserve the geometric properties of the mesh. For example, the differentiable tiling system 106 utilizes symmetry groups comprising a set of isometric affine transformations (rotations, translation, and reflection). In other words, the differentiable tiling system 106 uses symmetry groups to define a collection of transformations that, when applied to the mesh, result in an indistinguishable configuration in a new location.

To illustrate, the differentiable tiling system 106 utilizes tiles that correspond to a symmetry group G, and formally, the tile is some representation of the quotient of $\mathbb{R}^2$ under G. The differentiable tiling system 106 tiles the plane by applying each isometric transformation g∈G to the tile to move it to a copy g($\mathcal{T}$). Each group has a small, finite generating set of transformations which, when composed and inverted, generate the entire group. The differentiable tiling system 106 uses the generating set and its inverses to define the boundary conditions for the tile. As shown in the example of FIG. 4, a generating set of transformations can include two 90-degree rotations. In particular, the tile 410 is mapped to a copy 420 of itself by an isometry $g_i$ which is a member of the symmetry group describing the symmetries of the desired tiling. The boundary vertex $$v_i^{\partial}$$

is mapped by $g_i$ exactly to another boundary vertex, $$v_j^{\partial}.$$

The vertices A, B, and C are fixed axes of rotation.

In addition, the differentiable tiling system 106 determines the necessary and sufficient conditions to ensure a tile is tile-able for a given group G, as well as the tile-able boundary conditions. In particular, the differentiable tiling system 106 considers a valid tile $\mathcal{T}$, and one of its copies g($\mathcal{T}$) which is directly adjacent to it (e.g., their boundaries align as shown in FIG. 4). This alignment implies that some boundary vertex $$v_i^{\partial}$$

of aligns with a boundary vertex $$v_j^{\partial}$$

in the copied tile $$g(\mathcal{T}): v_i^{\partial} = g_i(v_j^{\partial}),$$

where the transformation is denoted as $g_i$ with a subscript indicating it is the specific member of the group G which aligns $$v_i^{\partial}$$

with its corresponding vertex $$v_j^{\partial}$$

in the shifted tile. Thus, every boundary vertex $$v_i^{\partial}$$

has a unique corresponding boundary vertex $$v_j^{\partial}$$

which aligns with it in some copy. These correspondences can be assigned for a given mesh by choosing a known, canonical vertex-placement which is tile-able, and deducing correspondence between vertices for that placement. Furthermore, a mesh $\mathcal{T}$ is a valid tile with respect to group G if it satisfies the following two necessary and sufficient tiling conditions: (1) all boundary vertices satisfy the tile-able boundary conditions $$g(\mathcal{T}): v_i^{\partial} = g_i(v_j^{\partial})$$

and (2) the mesh has no overlaps with itself. The differentiable tiling system 106 incorporates the tile-able boundary condition (1) into the optimization by considering each $g_i$ is a fixed affine transformation and hence, the requirement of $$g(\mathcal{T}): v_i^{\partial} = g_i(v_j^{\partial})$$

a linear equation.

Figure 5:
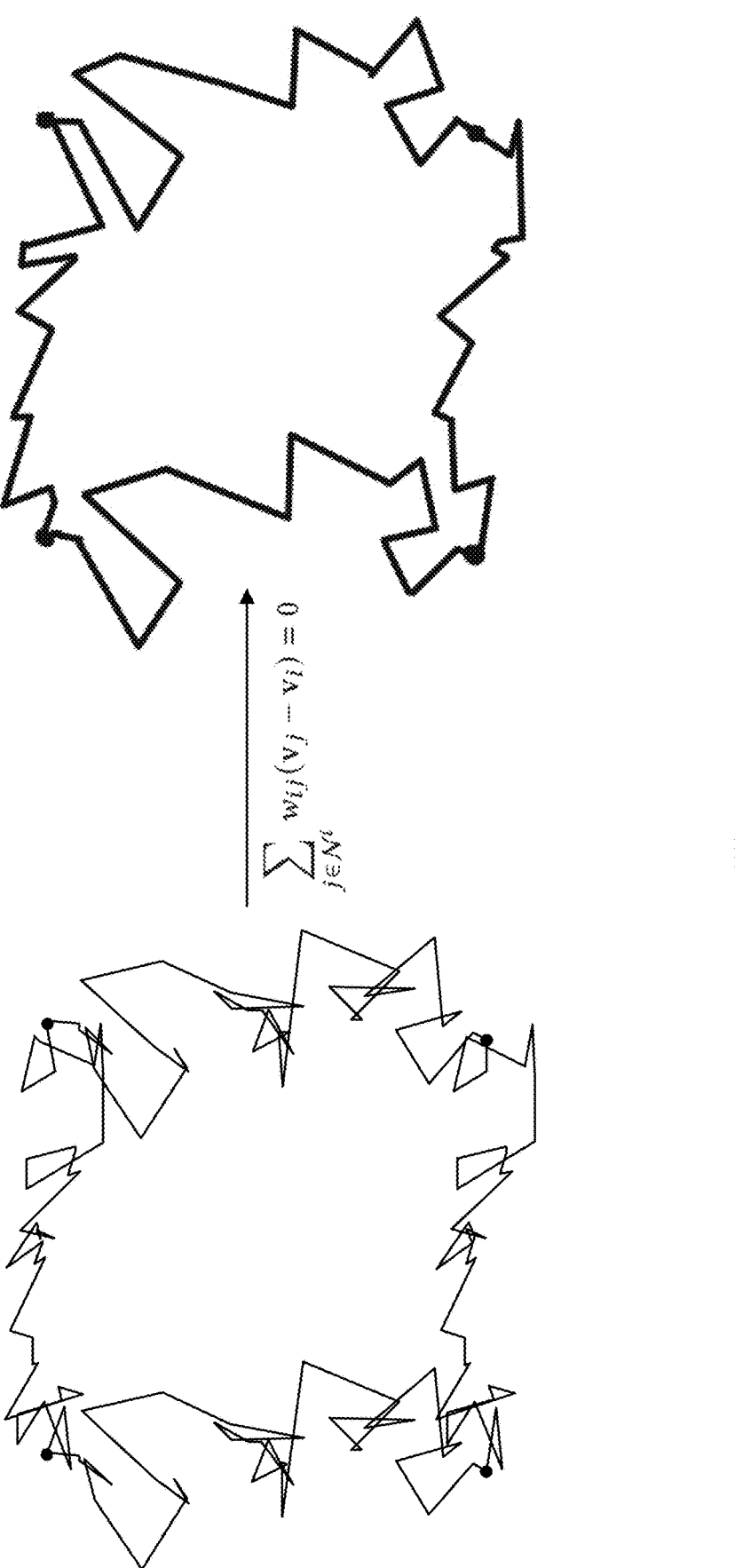
FIG. 5 illustrates utilizing edge weights and vertices to generate a mesh with non-overlapping boundary edges in accordance with one or more embodiments.

Notably, satisfying only the tile-able boundary condition (1) does not guarantee the tile is valid as it still may have overlaps (and not satisfy the overlap condition). Additionally, per condition (2), self-overlaps may happen not only due to the boundary overlapping itself, but also due to inverted triangles in the interior of the mesh which overlap other triangles. These can lead to entangled configurations that cannot be interpreted as defining a proper planar shape and cause significant rendering issues prohibiting the use of visual guidance via neural networks. To ensure the mesh represents a valid tile, the differentiable tiling system 106 ensures that condition (2) discussed above is also satisfied during optimization. FIG. 5 illustrates utilizing dynamic edge weights and vertices to guarantee non-overlapping boundary edges in accordance with one or more embodiments.

Notably, as the space of overlap-free configurations of a given triangulation is highly non-convex, the differentiable tiling system 106 need not directly enforce the constraint that the mesh has no self-overlaps. In particular, in some implementations, the differentiable tiling system 106 utilizes a method that receives a disk-topology triangular mesh and determines a solution of a linear system that satisfies the exact periodic boundary requirement of condition (1) and positions the vertices of the mesh such that it is overlap-free to satisfy condition (2). In particular, the differentiable tiling system 106 solves a discrete Laplacian equation, placing each vertex such that it is a weighted average of its neighbors and satisfies:

$$\sum_{j \in \mathcal{N}^i} w_{ij}(v_j - v_i) = 0,$$

where $\mathcal{N}^i$ are the neighbor vertices of $v_i$ (accounting for the periodicity of the boundary per FIG. 4), and $W=[w_{ij}]$ are predetermined positive dynamic edge weights assigned to each edge (i,j). In certain embodiments, the differentiable tiling system 106 uses weights stemming from the cotangent Laplacian and clamp them to be positive.

Indeed, the differentiable tiling system 106 defines the linear system as described for FIG. 4 and FIG. 5 (e.g., utilizing the equations $$g(\mathcal{T}): v_i^\beta = g_i\left(v_j^\beta\right)$$

and $\sum_{j \in \mathcal{N}^i} w_{ij}(v_j-v_i)=0$) to generate a solution that yields the final vertex positions, which is proven to be overlap-free. In particular, the differentiable tiling system 106 provides a way to parameterize the entire space of valid tile shapes. Namely, dynamic edge weights W, which are the coefficients of the Laplacian matrix, can be directly optimized to control the solution of the system, and in fact parameterize exactly the space of all possible tile shapes. In particular, a placement of the vertices V is a valid tile if there exist dynamic edge weights W assigned to the mesh's directed edges which realize that specific placement (e.g., a solution of the linear system described above) with respect to dynamic edge weights W leads to those specific vertices V.

Thus, the choice of W leads to a tile-able configuration of the mesh. To illustrate, assume the mesh is tile-able. Then, by the necessary and sufficient tiling conditions the differentiable tiling system 106 determines that V satisfy $$g(\mathcal{T}): v_i^\beta = g_i\left(v_j^\beta\right)$$

and the configuration has no overlaps. For a mesh with no overlaps, each vertex lies in the convex hull of its neighbors (accounting for periodicity of the boundary) and hence the differentiable tiling system 106 expresses the positive barycentric coordinates of its neighbors as $v_i = \sum_{j \in \mathcal{N}^i} b_j v_j$, and since $b_j$ sum to 1, such that $\sum_{j \in \mathcal{N}^i} b_j(v_j-v_i)=0$ (e.g., $b_j$ are exactly the dynamic edge weights $w_{ij}$ sought). With those dynamic edge weights W the vertices V also satisfy $\sum_{j \in \mathcal{N}^i} w_{ij}(v_j-v_i)=0$ and are a solution of the linear system. Furthermore, this approach yields an unconstrained, differentiable parameterization of valid, overlap-free tilings. Thus, the differentiable tiling system 106 provides the parameterization described above and uses the dynamic edge weights W as optimizable parameters to generate the tile-able image. In certain embodiments, the differentiable tiling system 106 also optimizes for a perceptive loss which is not rotation-invariant by applying a global rotation $R_\theta$ by an angle $\theta$ to the resulting vertex placement, $R_\theta(V)$ and add $\theta$ as a variable of the optimization. In one or more embodiments, the differentiable tiling system 106 parameterizes the entire space of valid tile shapes utilizing a method similar to that used for Orbifold Tutte Embeddings as described by Noam Aigerman and Yaron Lipman in Orbifold Tutte Embeddings, 2015, and Hyperbolic Orbifold Tutte Embeddings, 2016, incorporated by reference herein in its entirety.

Figure 6:
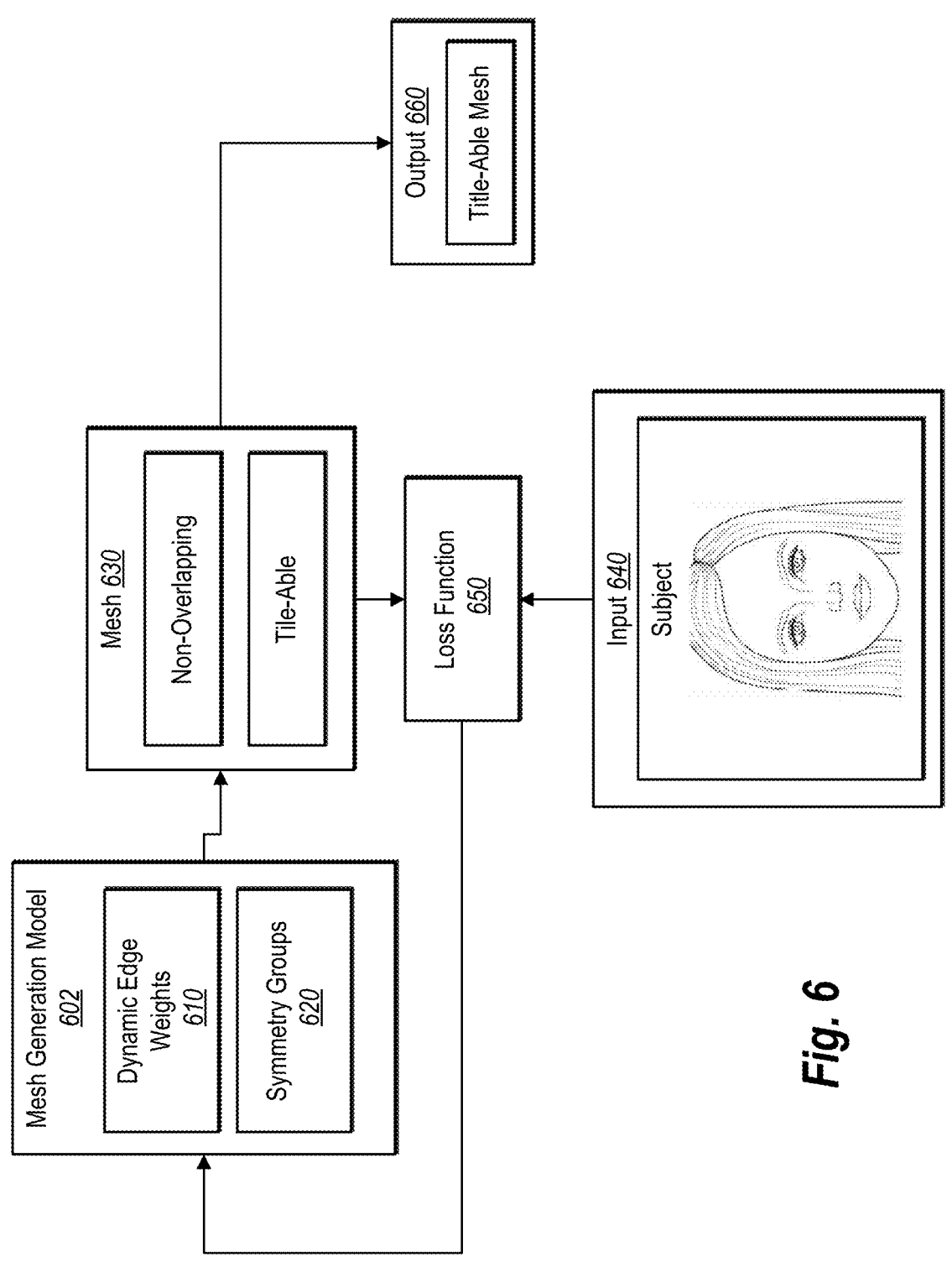
FIG. 6 illustrates utilizing an input to generate a tile-able image in accordance with one or more embodiments.

In one or more embodiments, the differentiable tiling system 106 creates a tile-able image that comprises a tile-able mesh. FIG. 6 illustrates utilizing an input to generate a tile-able mesh in accordance with one or more embodiments.

As shown in FIG. 6, the mesh generation model 602 utilizes dynamic edge weights 610 in conjunction with symmetry groups 620 to generate a mesh 630. Similar to the method described above in relation to FIG. 3, by modifying the dynamic edge weights of a Laplacian used to generate a mesh in accordance with one of the symmetry groups 620, the mesh generation model 602 can represent any tile-able mesh configuration (and only valid tile-able configurations) for some choice of dynamic edge weights 610. In particular, the mesh generation model 602 assigns new positions to the vertices of the mesh 630 through the solution of a linear system to guarantee a valid tile, with no self-overlaps, that can tile the plane. Further, because the vertices of the mesh are differentiable with respect to the dynamic edge weights 610, the differentiable tiling system 106 obtains an unconstrained, differentiable representation of all possible valid tile geometries corresponding to the symmetry groups 620 (e.g., mesh 630).

As further shown, the mesh generation model 602 determines a mesh 630 that satisfies the conditions of being non-overlapping and tile-able. As discussed, the differentiable tiling system 106 can utilize any valid tile as an initial mesh (e.g., a triangulation of a square, rhombus, or other shape). Furthermore, the differentiable tiling system 106 optimizes the mesh geometry by modifying the dynamic edge weights to determine the vertices of the mesh 630. The differentiable tiling system 106 utilizes a fixed, finite set of isometric 2D transformations (e.g., utilizing one of the symmetry groups 620) represented as periodic boundary conditions, which define the desired tiling pattern. For example, the differentiable tiling system 106 repeatedly applies transformations according to a symmetry group of the symmetry groups 620 to the mesh and repositions the vertices of the mesh to achieve a complete coverage of the 2D plane, without any overlaps between any two copies of the mesh 630 and without any self-overlaps of the mesh with itself.

As further shown in FIG. 6, the differentiable tiling system 106 receives an input 640 that denotes a tile-able subject. For example, as shown, the differentiable tiling system 106 receives an input 640 of a sketch that denotes a graphical object such as an image of a face. In one or more embodiments, the differentiable tiling system 106 can receive other inputs that denote a tile-able subject such as a photograph, video, text, image, and/or voice input. As shown, the differentiable tiling system 106 utilizes a loss function 650 including utilizing a geometric loss to determine the loss between the mesh 630 and the input 640 and updates the mesh 630 parameters based on the mesh 630 appearance matching the appearance of the input 640.

To illustrate, the differentiable tiling system 106 can generate a representation from the input 650 (e.g., a geometric representation or some other embedding representation) and compare the representation with the mesh 360. In particular, the loss function 650 measures a difference or distance to assess the similarity or dissimilarity between the mesh 630 and the input 640. The differentiable tiling system 106 can then utilize the loss function 650 to modify the edge weights 610 of the mesh generation model 602. By iteratively modifying the edge weights of the mesh generation model, the mesh generation model iteratively optimizes the mesh to align with the input 640. In this way, the differentiable tiling system 106 optimizes the mesh 630 appearance to match the input 640 and generate the output 660 of a tile-able mesh. In particular, given an input 640, the differentiable tiling system 106 produces a mesh that geometrically matches the input 640, is comprised of the desired object (with little to no background), and is tile-able.

Figure 7:
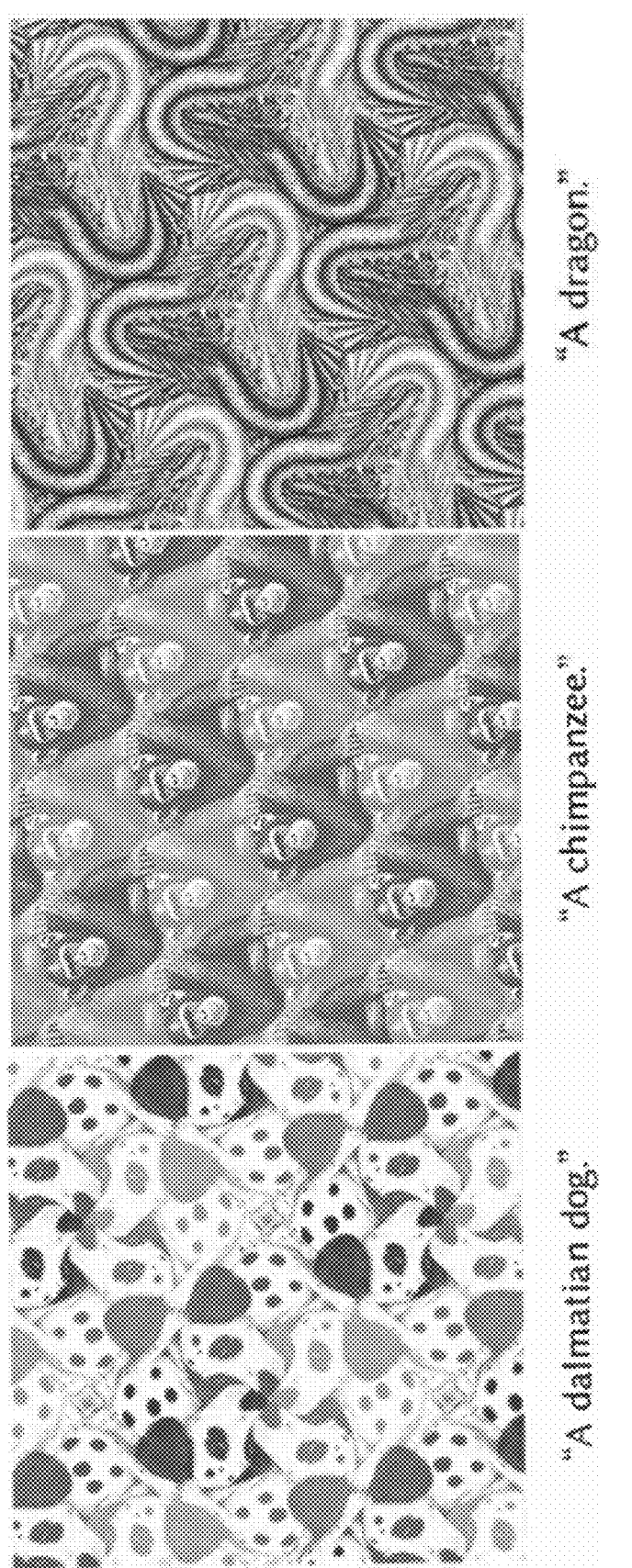
FIG. 7 illustrates tilings created by translated and rotated copies of a single, textured 2D mesh in accordance with one or more embodiments.

As mentioned, the differentiable tiling system 106 generates a mesh utilized to create tilings. FIG. 7 illustrates tilings created by translated and rotated copies of a single, textured 2D mesh in accordance with one or more embodiments.

In particular, a tiling is created by combining translated and rotated copies of a single, textured 2D mesh generated by the differentiable tiling system 106. As shown, given a text prompt (e.g., "A dalmatian dog," "A chimpanzee," or "A dragon") and a choice of a planar symmetry group, the differentiable tiling system 106 automatically generates a textured, non-square 2D mesh that matches the input prompt, and serves as a tile. For instance, the differentiable tiling system 106 can provide a graphical user interface with various interface elements. These interface elements can include an input element (e.g., for selecting a text prompt or another input prompt) and an additional input element for selecting a particular symmetry group (e.g., a drop-down menu for selecting one of the seventeen different symmetry groups). Based on these inputs, the differentiable tiling system 106 can generate a tile-able image and fill a two-dimensional plane with translated instances of the tile-able image. In particular, the tile-able image has no self-overlaps and can be shifted by the symmetry group to cover the entire plane without any overlaps between the tiles. As shown, the differentiable tiling system 106 can utilize a different color for different copies of the mesh to visually distinguish between the copies.

Notably, each input prompt leaves significant liberty in choice of the specific visuals (e.g., size, shape, style, perspective, amount of the subject), the differentiable tiling system 106 employs various strategies to create the mesh for the desired object, such as rendering the output in a wide-angle shot, a close-up, a full body, detailed view, and/or a general view. For example, in FIG. 7 the dalmatian dog is shown in a wide-angle shot, to enable shrinking the area occupied by the dog's backside and tail. As another example shown in FIG. 7, in the case of the chimpanzee, a photograph of the object is requested in the input prompt, and the differentiable tiling system 106 limits the optimization to the space of realistic visualizations, with more convex silhouettes, or truncates the less-salient parts of the shape to avoid breaking realism. As another example shown in FIG. 7, in the case of the dragon, the differentiable tiling system 106 creates a tile that incorporates a truncated version of a dragon that emphasizes the salient features of the dragon's head and tail.

Figure 8:
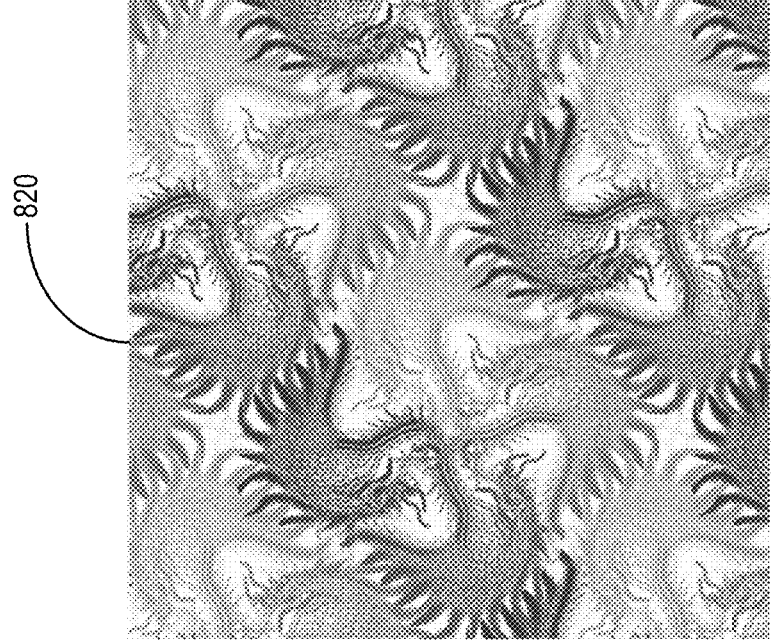
FIG. 8 illustrates a tiling created by translated and rotated copies of a single, textured 2D mesh without incorporating excess background color in accordance with one or more embodiments.
Figure 8:
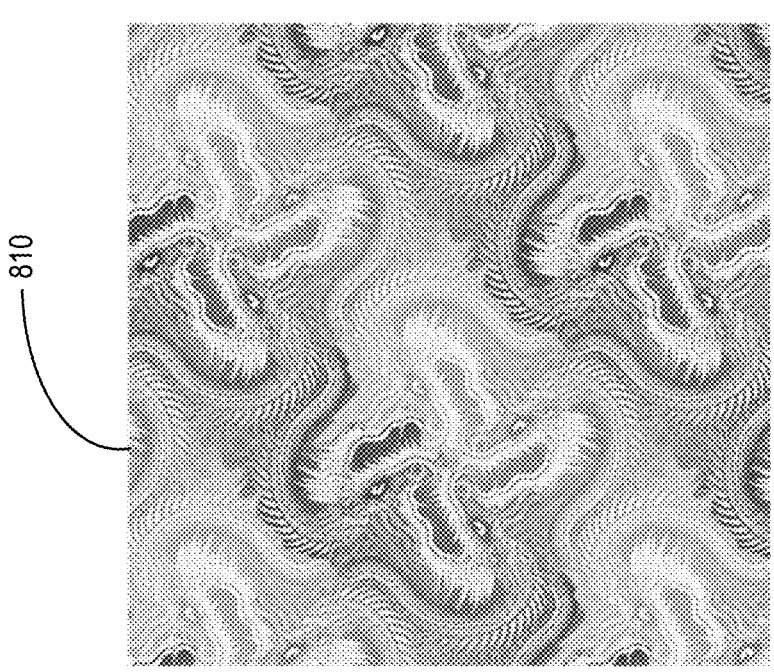

As mentioned, the differentiable tiling system 106 creates tiles comprised of the foreground object (with little or no excess background). FIG. 8 illustrates a tiling created by translated and rotated copies of a single, textured 2D mesh without incorporating excess background color in accordance with one or more embodiments. In particular, by randomizing the background color of the rendered image (e.g., the rendered image 360 in FIG. 3), the differentiable tiling system 106 produces a plausible tile 810 of "A Chinese dragon head" that is tile-able to cover the entire plane without including extra background color. In contrast, if the background color of the optimization is fixed (e.g., fixing it to white), in some cases the results may portray a less plausible result as shown by tile 820. Indeed, the differentiable tiling system 106 utilizes a randomized background color of the rendered image to create a plausible tile-able mesh that fills the tile area with the foreground object such as illustrated in the tile 810. Thus, the differentiable tiling system 106 randomizes the background color to generate a tile utilizing a loss function (e.g., the loss function 370 in FIG. 3) that excludes the background from its determination and modifies the geometry of the foreground object. Notably, in this manner, the differentiable tiling system 106 has more freedom in how to texture the tile and modify the geometry of tile-able mesh.

Figure 9:
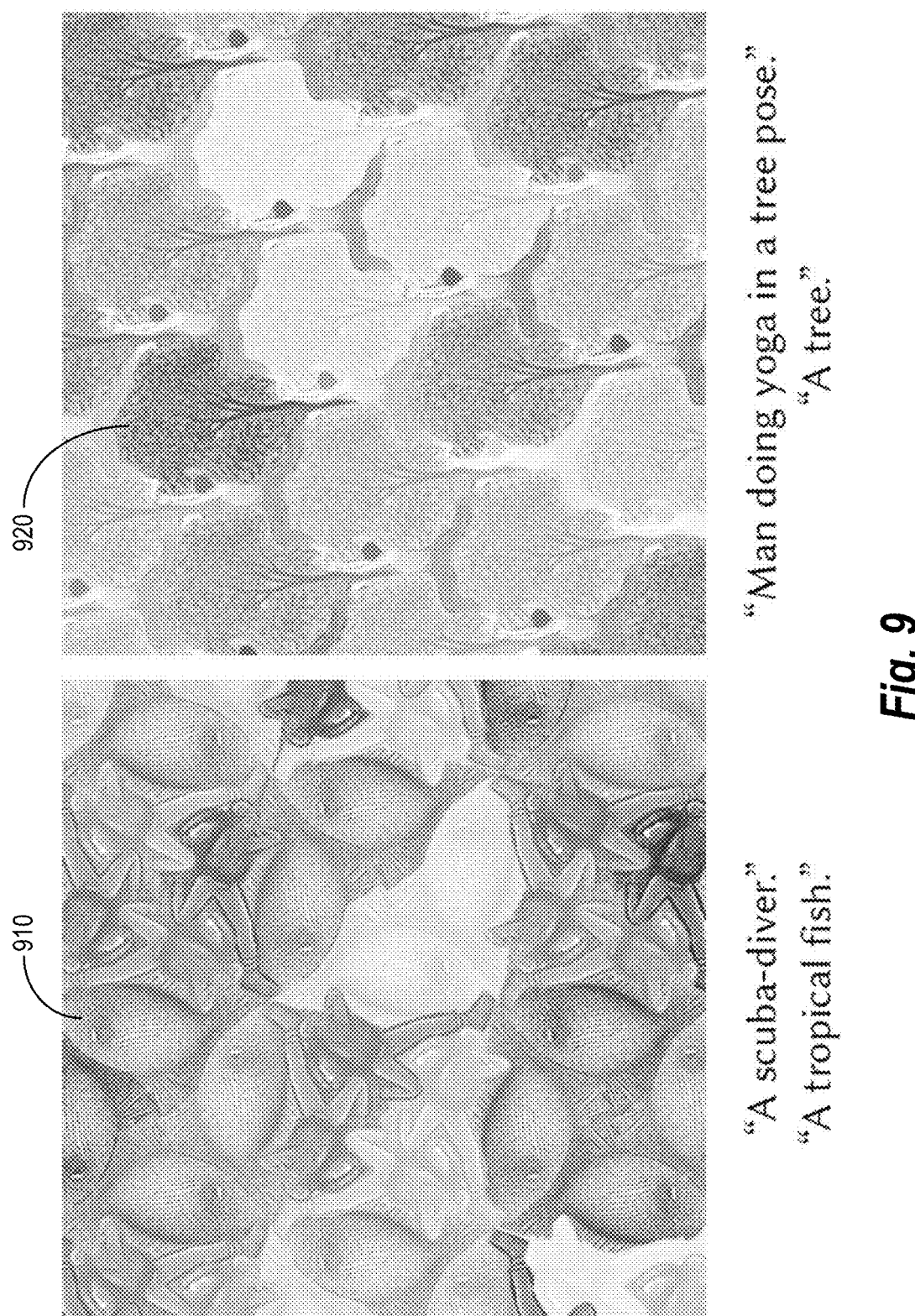
FIG. 9 illustrates creating a tiling utilizing two tile shapes for two different subjects in accordance with one or more embodiments.

In one or more embodiments, the differentiable tiling system 106 optimizes for two tile shapes for two different input prompts (or a single input prompt with two subjects). FIG. 9 illustrates creating a tiling by utilizing two tile shapes for two different subjects in accordance with one or more embodiments. In particular, the differentiable tiling system 106 optimizes simultaneously for two tile shapes for two different prompts, by having each shape contribute to a portion (e.g., or half) of the underlying mesh. For example, the differentiable tiling system 106 splits the mesh into two portions, each with a different prompt, and computes the loss for each input (e.g., each portion of the mesh) separately, thereby yielding two different objects with distinctly separate contours within the tile. As shown in FIG. 9, the differentiable tiling system 106 creates a tile-able mesh 910 that includes "A scuba-diver" and "A tropical fish." Further, as also shown in FIG. 9, the differentiable tiling system 106 creates a tile-able mesh 920 that includes a "Man doing yoga in tree pose" and "A tree." In certain embodiments, the differentiable tiling system 106 renders each portion of the tile-able mesh in a different color and texture to visually delineate each object.

Figure 10:
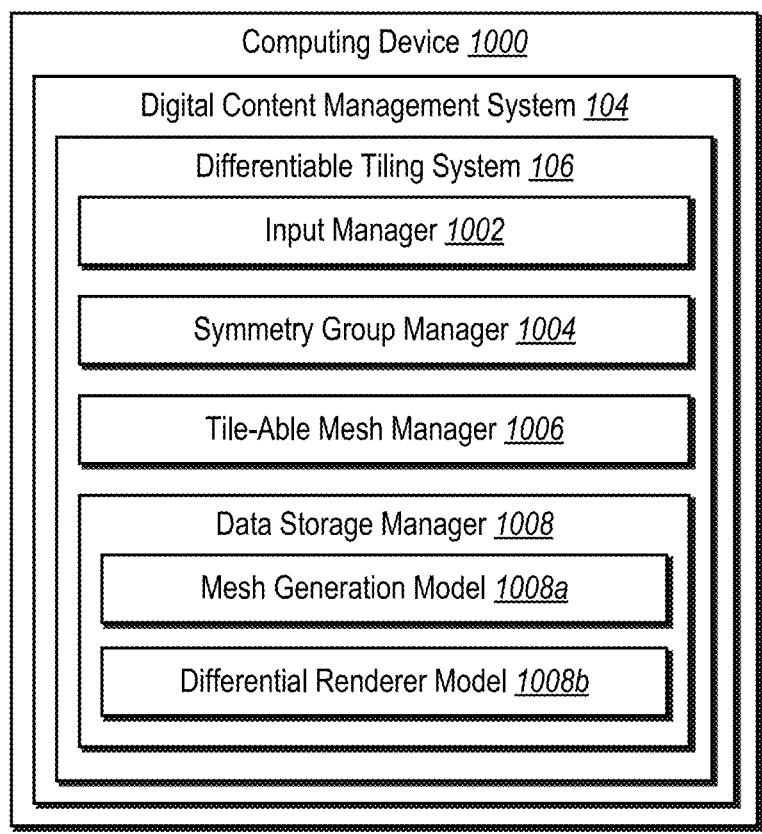
FIG. 10 illustrates a schematic diagram of a differentiable tiling system in accordance with one or more embodiments.

Turning now to FIG. 10, additional detail will now be provided regarding various components and capabilities of the differentiable tiling system 106. In particular, FIG. 10 illustrates the differentiable tiling system 106 implemented by the computing device 1000 (e.g., the server device(s) 102, and/or one of the client device(s) 110, discussed above with reference to FIG. 1). Additionally, the differentiable tiling system 106 is also part of the digital content management system 104. As shown in FIG. 10, the differentiable tiling system 106 includes, but is not limited to, an input manager 1002, a symmetry group manager 1004, a tile-able mesh manager 1006, and a data storage manager 1008.

As just mentioned, and as illustrated in FIG. 10, the differentiable tiling system 106 includes the input manager 1002. In one or more embodiments, the input manager 1002 retrieves or determines an input comprising a subject for a tile-able image. As mentioned above, the input manager 1002 manages utilizes the input to determine an object (e.g., subject) used to generate a textured 2D triangular mesh that visually resembles an object denoted by the input. Furthermore, the input manager 1002 manages input that can include textual input, photographic input, video input, voice input, image input, and/or other types of input that denote a subject.

Additionally, as shown in FIG. 10, the differentiable tiling system 106 includes the symmetry group manager 1004. The differentiable tiling system 106 utilizes a choice of a planar symmetry group to generate a textured, non-square 2D mesh that matches the input prompt. In particular, the differentiable tiling system 106 utilizes the symmetry group manager 1004 to manage and utilize symmetry groups to generate a mesh that can be copied and shifted to cover the entire plane without any overlaps between the copies of the mesh. For example, the symmetry group manager 1004 utilizes a generative method to generate tilings formed by quotients of the symmetry groups (e.g., produced by repeatedly applying a finite set of transformations to one tile). In one or more embodiments, the symmetry group manager 1004 utilizes symmetry groups that each comprise a discrete set of isometric affine transformations.

As further shown in FIG. 10, the differentiable tiling system 106 includes the tile-able mesh manager 1006. In particular, the differentiable tiling system 106 generates and manages textured 2D triangular meshes that visually resemble objects denoted by input prompts. In one or more embodiments, using a trained diffusion model, the tile-able mesh manager 1006 optimizes the shape of an object denoted by an input, while respecting the constraint that the shape of the object is tile-able. Further, the tile-able mesh manager 1006 optimizes both the texture, as well as the actual shape of the object, while maintaining its tile-ability. For example, the tile-able mesh manager 1006 utilizes an interaction between the geometry and the texture to determine a tile-able image that contains little to no background.

Additionally, as shown, the differentiable tiling system 106 includes data storage manager 1008. In particular, data storage manager 1008 (implemented by one or more memory devices) stores the digital content used by the differentiable tiling system 106 including the input, texture images, symmetry groups, meshes, and rendered images. The data storage manager 1008 facilitates the creation of tile-able meshes by the differentiable tiling system 106. As shown, the data storage manager 1008 incorporates the mesh generation model 1008*a* and the differential renderer model 1008*b*. The differentiable tiling system 106 modifies the dynamic edge weights of a mesh generation model 1008*a* utilizing gradient optimization to update the dynamic edge weights in a progressive manner. The mesh generation model 1008*a* generates the mesh such that the edges and the vertices align between repeatable instances of the mesh. The differentiable tiling system 106 utilizes a differential renderer model 1008*b* to generate a rendered image from the mesh and the dynamic texture image. The differentiable tiling system 106 utilizes this rendered image to modify the mesh and the dynamic texture image to reflect to the textual input.

Each of the components 1002-1008 of the differentiable tiling system 106 can include software, hardware, or both. For example, the components 1002-1008 can include one or more instructions stored on a computer-readable storage medium and executable by processors of one or more computing devices, such as a client device or server device. When executed by the one or more processors, the computer-executable instructions of the differentiable tiling system 106 can cause the computing device(s) to perform the methods described herein. Alternatively, the components 1002-1008 can include hardware, such as a special-purpose processing device to perform a certain function or group of functions. Alternatively, the components 1002-1008 of the differentiable tiling system 106 can include a combination of computer-executable instructions and hardware.

Furthermore, the components 1002-1008 of the differentiable tiling system 106 may, for example, be implemented as one or more operating systems, as one or more standalone applications, as one or more modules of an application, as one or more plug-ins, as one or more library functions or functions that may be called by other applications, and/or as a cloud-computing model. Thus, the components 1002-1008 of the differentiable tiling system 106 may be implemented as a stand-alone application, such as a desktop or mobile application. Furthermore, the components 1002-1008 of the differentiable tiling system 106 may be implemented as one or more web-based applications hosted on a remote server. Alternatively, or additionally, the components 1002-1008 of the differentiable tiling system 106 may be implemented in a suite of mobile device applications or "apps." For example, in one or more embodiments, the differentiable tiling system 106 can comprise or operate in connection with digital software applications such as: ADOBE® PHOTOSHOP, ADOBE® PHOTOSHOP ELEMENTS, ADOBE® ILLUSTRATOR, ADOBE® LIGHTROOM, ADOBE® INDESIGN, ADOBE® XD, ADOBE® FRESCO, ADOBE® PROTEUS, ADOBE® EXPRESS, ADOBE® ACROBAT PRO DC, or ADOBE® FIGMA. The foregoing are either registered trademarks or trademarks of Adobe Inc. in the United States and/or other countries.

Figure 11:
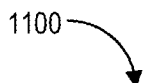
FIGS. 11-12 illustrate flowcharts of a series of acts for generating a tile-able mesh in accordance with one or more embodiments.
Figure 11:
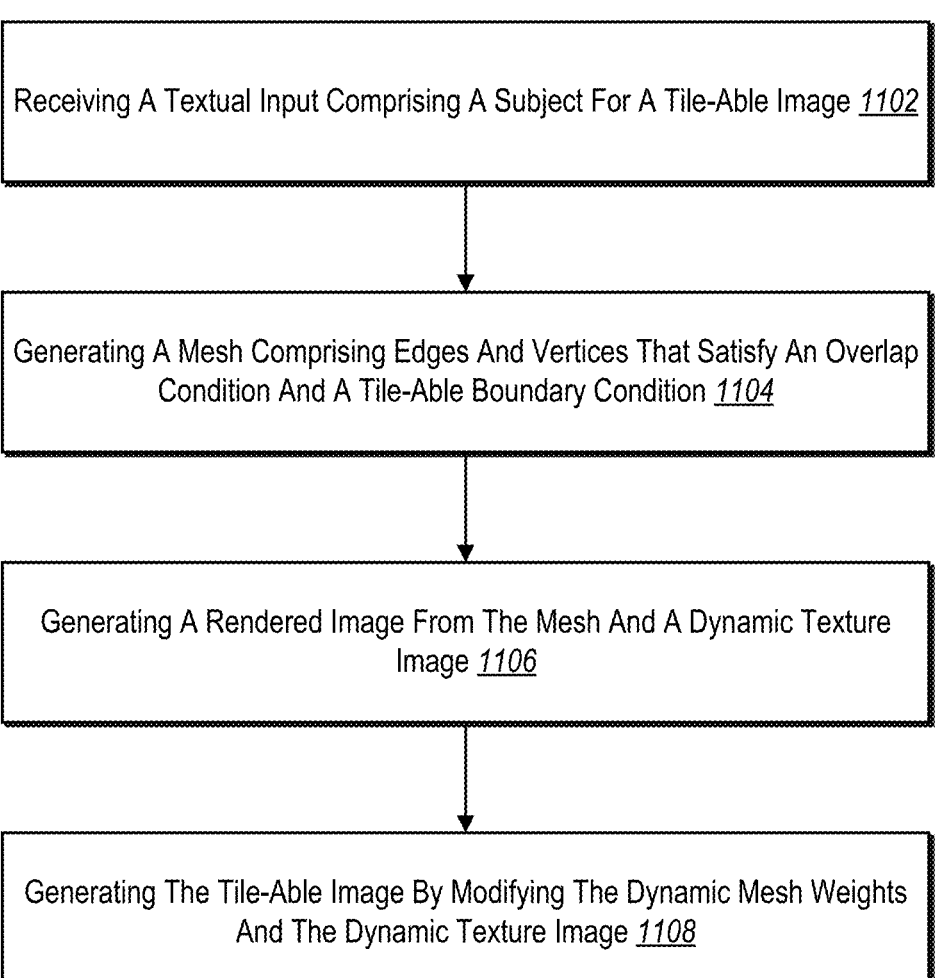
Figure 12:
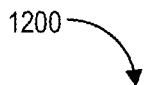
Figure 12:
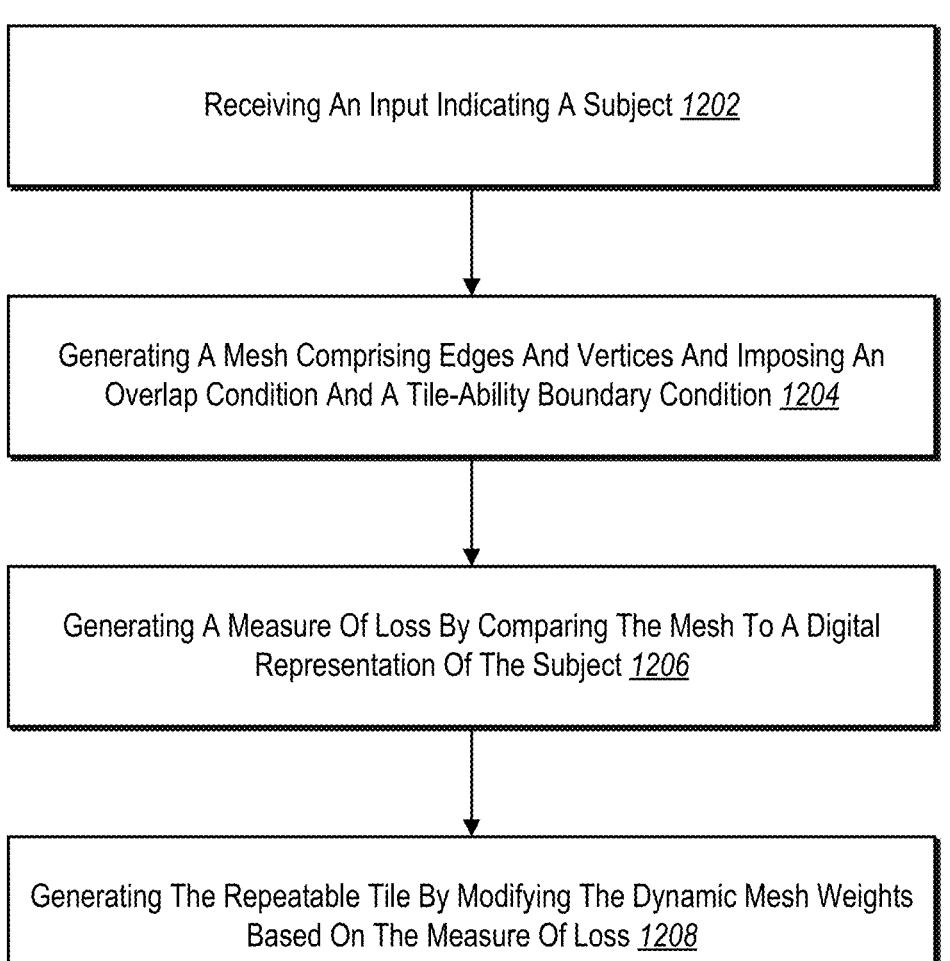

FIGS. 1-10, the corresponding text, and the examples provide a number of different methods, systems, devices, and non-transitory computer-readable media of the differentiable tiling system 106. In addition to the foregoing, one or more embodiments can also be described in terms of flowcharts comprising acts for accomplishing a particular result, as shown in FIGS. 11-12. The acts shown in FIGS. 11-12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 11-12. In some embodiments, a system can be configured to perform the acts of FIGS. 11-12. Alternatively, the acts of FIGS. 11-12 can be performed as part of a computer-implemented method.

FIG. 11 illustrates a flowchart of a series of acts 1100 for of using a differentiable tiling system 106 to generate a tile-able image in accordance with one or more embodiments. While FIG. 11 illustrates acts according to one embodiment, alternative embodiments may omit, add to, reorder, and/or modify any acts shown in FIG. 11.

FIG. 11 illustrates an example series of acts 1100 for utilizing a differentiable tiling system 106 to generate a tile-able image. In particular, the series of acts 1100 includes an act 1102 of receiving a textual input comprising a subject for a tile-able image. As illustrated, the series of acts 1100 can also include an act 1104 of generating a mesh comprising edges and vertices that satisfy an overlap condition and a tile-able boundary condition. Specifically, the act 1104 can include generating, based on dynamic edge weights of a mesh generation model, a mesh comprising edges and vertices that satisfy an overlap condition and a tile-able boundary condition. As illustrated, the series of acts 1100 can also include an act 1106 of generating a rendered image from the mesh and a dynamic texture image. Specifically, the act 1106 can include generating, utilizing a renderer, a rendered image from the mesh and a dynamic texture image. As illustrated, the series of acts 1100 can also include an act 1108 of generating the tile-able image by modifying the dynamic mesh weights and the dynamic texture image. Specifically, the act 1108 can include generating the tile-able image by modifying the dynamic edge weights and the dynamic texture image based on a measure of loss between the rendered image and a vector representation of the textual input.

In addition (or in the alternative) to the acts described above, the differentiable tiling system series of acts 1100 can include generating mesh edges and vertices that satisfy the overlap condition comprises generating, utilizing the dynamic edge weights of the mesh generation model, the edges and the vertices to guarantee non-overlapping boundary edges and non-overlapping interior edges. The series of acts 1100 can also include modifying the dynamic edge weights to generate modified dynamic edge weights. Moreover, in one or more embodiments, the differentiable tiling system 106 series of acts 1100 includes modifying the dynamic texture image to generate a modified texture image. Further still, in some embodiments, the differentiable tiling system 106 series of acts 1100 includes generating, based on the modified dynamic edge weights of the mesh generation model, a modified mesh that satisfies the overlap condition and the tile-able boundary condition.

Furthermore, in one or more embodiments, the differentiable tiling system series of acts 1100 includes utilizing a differentiable renderer and further comprising generating, utilizing the differentiable renderer, an additional rendered image from the modified mesh and the modified texture image. Moreover, in one or more embodiments, the differentiable tiling system 106 series of acts 1100 includes generating the tile-able image from the additional rendered image. Further still, in some embodiments, the differentiable tiling system 106 series of acts 1100 includes generating the mesh such that the mesh can be repeated indefinitely with non-square boundaries defined by the edges and the vertices aligning between all instances of the mesh. Furthermore, in one or more embodiments, the differentiable tiling system series of acts 1100 includes generating the tile-able image by randomizing a background color in the dynamic texture image. Moreover, in one or more embodiments, the series of acts 1100 includes utilizing a first learning rate for updating the dynamic edge weights and utilizing a second learning rate for updating the dynamic texture image, wherein the first learning weight is different than the second learning rate.

FIG. 12 illustrates a flowchart of a series of acts 1200 for of using a differentiable tiling system 106 to generate a tile-able image in accordance with one or more embodiments. While FIG. 12 illustrates acts according to one embodiment, alternative embodiments may omit, add to, reorder, and/or modify any acts shown in FIG. 12.

FIG. 12 illustrates an example series of acts 1200 for utilizing a differentiable tiling system 106 to generate a tile-able image. In particular, the series of acts 1200 includes an act 1202 of receiving an input indicating a subject. Specifically, the act 1202 can include receiving an input indicating a subject for a repeatable tile. As illustrated, the series of acts 1200 can also include an act 1204 of generating a mesh comprising edges and vertices and imposing an overlap condition and a tile-ability boundary condition. Specifically, the act 1204 can include generating, based on dynamic edge weights of a mesh generation model, a mesh comprising edges and vertices wherein the mesh generation model utilizes a linear model and the dynamic edge weights to impose an overlap condition such that no edges of the mesh overlap and a tile-ability boundary condition such that the mesh can be repeated indefinitely with boundaries defined by the edges and the vertices aligning between repeating tile-able instances of the mesh. As illustrated, the series of acts 1100 can also include an act 1206 of generating a measure of loss by comparing the mesh to a digital representation of the subject. As illustrated, the series of acts 1200 can also include an act 1208 of generating the repeatable tile by modifying the dynamic mesh weights based on the measure of loss.

In addition (or in the alternative) to the acts described above, the differentiable tiling system series of acts 1200 can include receiving the input comprises receiving textual content indicating the subject. Furthermore, in one or more embodiments, the differentiable tiling system series of acts 1200 includes generating the measure of loss comprises comparing the textual content and the mesh. Moreover, in one or more embodiments, the series of acts 1200 includes modifying the dynamic edge weights comprises utilizing gradient optimization to modify the dynamic edge weights of the differentiable mesh generation model. Further still, in one or more embodiments, the series of acts 1200 includes receiving the input comprises receiving a visual representation of the subject. Furthermore, in one or more embodiments, the differentiable tiling system series of acts 1200 includes generating the measure of loss comprises comparing the visual representation and the mesh.

Moreover, in one or more embodiments, the series of acts 1200 includes generating mesh edges and vertices to impose the overlap condition comprises generating, utilizing the mesh generation model, the mesh to guarantee non-overlapping boundary edges. Further still, in one or more embodiments, the series of acts 1200 includes generating, utilizing a differentiable renderer, a rendered image from the mesh and a dynamic texture image. Additionally, in one or more embodiments, the series of acts 1200 includes determining the measure of loss by comparing the rendered image and a vector representation of the input. Moreover, in one or more embodiments, the series of acts 1200 includes generating a tile-able image by modifying the dynamic edge weights and the dynamic texture image based on the measure of loss.

Further, in one or more embodiments, the series of acts 1200 includes receiving the input comprises receiving the subject and an additional subject for the repeatable tile. Moreover, in one or more embodiments, the series of acts 1200 includes generating an additional measure of loss by comparing the mesh to the digital representation of the additional subject. Furthermore, in one or more embodiments, the series of acts 1200 includes updating the mesh by modifying the dynamic edge weights based on the measure of loss and the additional measure of loss.

Further still, in one or more embodiments, the series of acts 1200 includes receiving a textual input comprising a subject for a tile-able image. Moreover, in one or more embodiments, the series of acts 1200 includes generating, based on dynamic edge weights of a mesh generation model, a mesh comprising edges and vertices that satisfy an overlap condition and a tile-able boundary condition. Furthermore, in one or more embodiments, the series of acts 1200 includes generating, utilizing a renderer, a rendered image from the mesh and a dynamic texture image. Moreover, in one or more embodiments, the series of acts 1200 includes generating the tile-able image by modifying the dynamic edge weights and the dynamic texture image based on a measure of loss between the rendered image and a vector representation of the textual input. Furthermore, in one or more embodiments, the series of acts 1200 includes generating the mesh utilizing the mesh generation model comprises generating the mesh utilizing a differentiable mesh generation model. Further still, in one or more embodiments, the series of acts 1200 includes generating the mesh such that the edges and the vertices align between repeatable instances of the mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
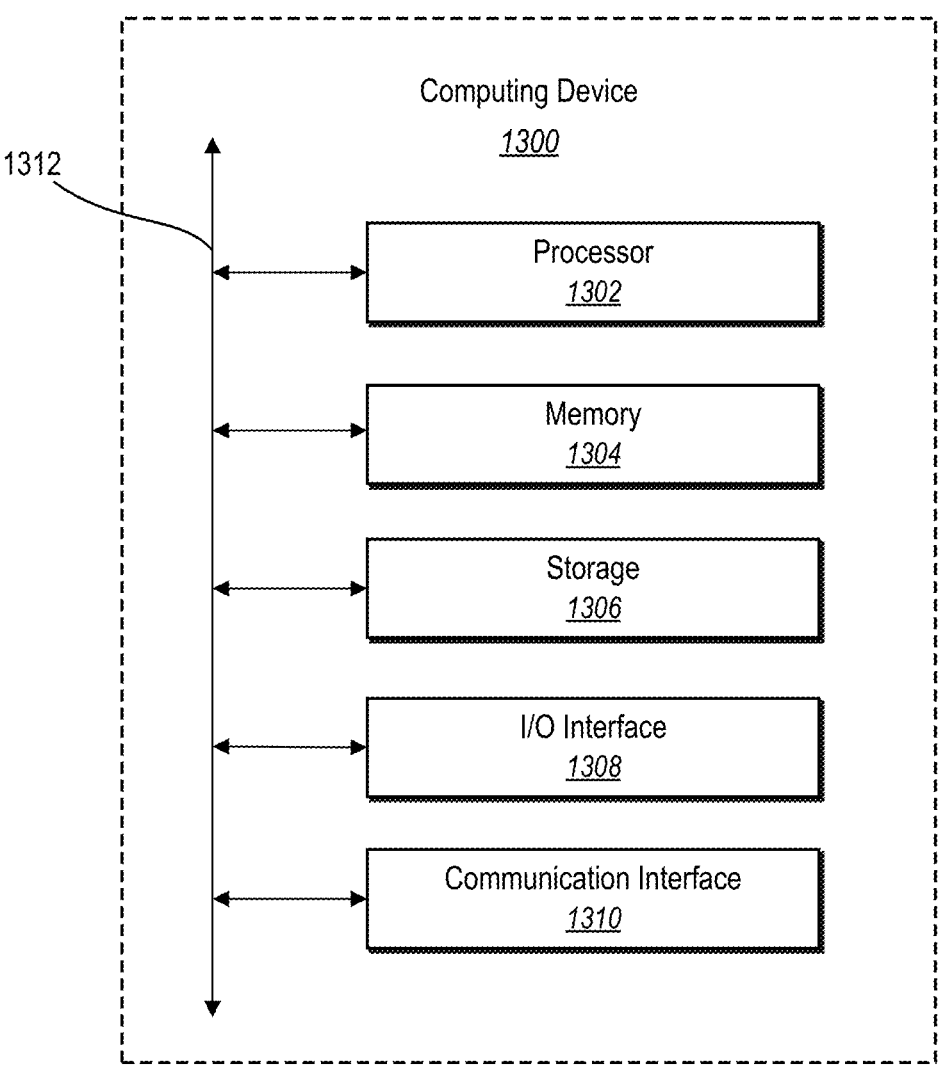
FIG. 13 illustrates a block diagram of an example computing device in accordance with one or more embodiments.

FIG. 13 illustrates a block diagram of an example computing device that may be configured to perform one or more of the processes described above. One will appreciate that one or more computing devices, such as the computing device 1300 may represent the computing devices described above (e.g., server device(s) 102, client device(s) 110, and computing device 1300). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
   receiving a textual input comprising a subject for a tile-able image;
   generating, based on dynamic edge weights of a mesh generation model, a mesh comprising edges and vertices that satisfy an overlap condition and a tile-able boundary condition;
   generating, utilizing a renderer, a rendered image from the mesh and a dynamic texture image; and
   generating the tile-able image by modifying the dynamic edge weights and the dynamic texture image based on a measure of loss between the rendered image and a vector representation of the textual input.

2. The method of claim 1, wherein generating mesh edges and vertices that satisfy the overlap condition comprises generating, utilizing the dynamic edge weights of the mesh generation model, the edges and the vertices to guarantee non-overlapping boundary edges and non-overlapping interior edges.

3. The method of claim 1, further comprising:
   modifying the dynamic edge weights to generate modified dynamic edge weights;
   modifying the dynamic texture image to generate a modified texture image; and generating, based on the modified dynamic edge weights of the mesh generation model, a modified mesh that satisfies the overlap condition and the tile-able boundary condition.

4. The method of claim 3, wherein the renderer is a differentiable renderer and further comprising:

generating, utilizing the differentiable renderer, an additional rendered image from the modified mesh and the modified texture image; and generating the tile-able image from the additional rendered image.

5. The method of claim 1, wherein generating the mesh comprising the edges and the vertices that satisfy the tile-able boundary condition comprises generating the mesh such that the mesh can be repeated indefinitely with non-square boundaries defined by the edges and the vertices aligning between all instances of the mesh.

6. The method of claim 1, further comprising generating the tile-able image by randomizing a background color in the dynamic texture image.

7. The method of claim 1, further comprising:

utilizing a first learning rate for updating the dynamic edge weights; and utilizing a second learning rate for updating the dynamic texture image, wherein the first learning rate is different than the second learning rate.

8. A system comprising:

a memory component; and one or more processing devices coupled to the memory component, the one or more processing devices to perform operations comprising:

receiving an input indicating a subject for a repeatable tile;

generating, based on dynamic edge weights of a mesh generation model, a mesh comprising edges and vertices wherein the mesh generation model utilizes a linear model and the dynamic edge weights to impose:

an overlap condition such that no edges of the mesh overlap, and a tile-ability boundary condition such that the mesh can be repeated indefinitely with boundaries defined by the edges and the vertices aligning between repeating tile-able instances of the mesh;

generating a measure of loss by comparing the mesh to a digital representation of the subject; and generating the repeatable tile by modifying the dynamic edge weights based on the measure of loss.

9. The system of claim 8, wherein generating the mesh utilizing the mesh generation model comprises generating the mesh utilizing a differentiable mesh generation model wherein the dynamic edge weights comprise modifiable parameters of the differentiable mesh generation model.

10. The system of claim 9, wherein:

receiving the input comprises receiving textual content indicating the subject;

generating the measure of loss comprises comparing the textual content and the mesh; and modifying the dynamic edge weights comprises utilizing gradient optimization to modify the dynamic edge weights of the differentiable mesh generation model.

11. The system of claim 8, wherein:

receiving the input comprises receiving a visual representation of the subject; and generating the measure of loss comprises comparing the visual representation and the mesh.

12. The system of claim 8, wherein generating mesh edges and vertices to impose the overlap condition comprises generating, utilizing the mesh generation model, the mesh to guarantee non-overlapping boundary edges.

13. The system of claim 8, wherein the operations further comprise generating, utilizing a differentiable renderer, a rendered image from the mesh and a dynamic texture image.

14. The system of claim 13, wherein the operations further comprise determining the measure of loss by comparing the rendered image and a vector representation of the input.

15. The system of claim 14, wherein the operations further comprise generating a tile-able image by modifying the dynamic edge weights and the dynamic texture image based on the measure of loss.

16. The system of claim 8, wherein:

receiving the input comprises receiving the subject and an additional subject for the repeatable tile;

generating an additional measure of loss by comparing the mesh to the digital representation of the additional subject; and updating the mesh by modifying the dynamic edge weights based on the measure of loss and the additional measure of loss.

17. A non-transitory computer readable medium storing executable instructions which, when executed by a processing device, cause the processing device to perform operations comprising:

receiving a textual input comprising a subject for a tile-able image;

generating, based on dynamic edge weights of a mesh generation model, a mesh comprising edges and vertices that satisfy an overlap condition and a tile-able boundary condition;

generating, utilizing a renderer, a rendered image from the mesh and a dynamic texture image; and generating the tile-able image by modifying the dynamic edge weights and the dynamic texture image based on a measure of loss between the rendered image and a vector representation of the textual input.

18. The non-transitory computer readable medium of claim 17, wherein generating the mesh utilizing the mesh generation model comprises generating the mesh utilizing a differentiable mesh generation model.

19. The non-transitory computer readable medium of claim 17, wherein generating the mesh comprising the edges and the vertices that satisfy the tile-able boundary condition comprises generating the mesh such that the edges and the vertices align between repeatable instances of the mesh.

20. The non-transitory computer readable medium of claim 17, further comprising:

modifying the dynamic edge weights to generate modified dynamic mesh weights;

modifying the dynamic texture image to generate a modified texture image;

generating, based on the modified dynamic mesh weights of the mesh generation model, a modified mesh that satisfies the overlap condition and the tile-able boundary condition;

generating, utilizing a renderer, an additional rendered image from the modified mesh and the modified texture image; and generating the tile-able image from the additional rendered image.

* * * * *